United States Patent [19]

Patel et al.

[11] Patent Number: 5,331,416
[45] Date of Patent: Jul. 19, 1994

[54] METHODS FOR OPERATING GHOST-CANCELATION CIRCUITRY FOR TV RECEIVER OR VIDEO RECORDER

[75] Inventors: Chandrakant B. Patel, Hopewell, N.J.; Jim Yang, Philadelphia, Pa.

[73] Assignee: Samsung Electronics Co., Ltd., Kyungki, Rep. of Korea

[21] Appl. No.: 984,486

[22] Filed: Dec. 2, 1992

[51] Int. Cl.$^5$ .................................. H04N 5/213
[52] U.S. Cl. ........................................ 348/614
[58] Field of Search .............. 358/167, 166, 905, 36, 358/340; 375/11, 12, 13, 14; H04N 5/213, 9/64

[56] References Cited

U.S. PATENT DOCUMENTS

| | | | |
|---|---|---|---|
| 4,481,643 | 11/1986 | Kitazawa | 358/905 |
| 4,897,725 | 1/1990 | Tanaka et al. | 358/36 |
| 4,912,557 | 3/1990 | Faroudja | 358/167 |
| 5,053,870 | 10/1991 | Ito et al. | 358/167 |
| 5,055,929 | 10/1991 | Sakai | 358/905 |
| 5,111,298 | 5/1992 | Koo | 358/905 |
| 5,170,260 | 12/1992 | Tabata | 358/167 |

Primary Examiner—James J. Groody
Assistant Examiner—Michael H. Lee
Attorney, Agent, or Firm—Sughrue, Mion, Zinn, Macpeak & Seas

[57] ABSTRACT

Ghosts accompanying composite video signals are suppressed using separate filters for suppressing macroghosts and microghosts, the filtering parameters of these filters being adjustable responsive to digital programming signals generated by a computer. Computation includes data acquisition and channel characterization steps followed by a decision step for comparing the most recent set of channel characterization results with the next most recent set to determine whether stable ghosting conditions obtain. Data acquisition and channel characterization steps are repeated until stable ghosting conditions obtain, so the subsequent calculations with respect to the filter used for suppressing macroghosts are accurately performed. Where the filter suppressing macroghosts includes IIR and FIR sections for suppressing post-ghosts and preghosts, respectively, these calculations are carried out substantially on a separable basis, simplifying the calculations. Then, a step of calculating the filtering parameters for the FIR filter used for suppressing microghosts is followed by further data acquisition and channel characterization steps and a decision step comparing the most recent set of further channel characterization results with the next most recent set of further channel characterization results to determine similarity. If the sets of further channel characterization results are substantially the same, either method loops back to the further data acquisition step; if not, the adjustable filtering parameters for the filters are reset to initial values and the method restarts automatically.

29 Claims, 12 Drawing Sheets

METHODS FOR OPERATING GHOST-CANCELATION CIRCUITRY FOR TV RECEIVER OR VIDEO RECORDER

The invention relates to ghost-cancelation circuitry as used in a television receiver or in a video tape recorder and, more particularly, to methods for calculating the parameters of filters used for suppressing ghosts in composite video signals supplied from the video detector of a TV receiver or video tape recorder.

BACKGROUND OF THE INVENTION

Television engineers have given considerable thought to ghost-cancelation circuitry for inclusion in television receivers that also include a display device for reproducing the television image in a form suitable for viewing by humans. Ghost images, caused by multipath reception and commonly referred to as "ghosts", are a common occurrence in television pictures that have been broadcast over the air or have been transmitted by cable.

The signal to which the television receiver synchronizes is the strongest of the signals it receives, which is called the reference signal, and is usually the direct signal received over the shortest reception path. The multipath signals received over other paths are thus usually delayed with respect to the reference signal and appear as trailing ghost images. It is possible, however, that the direct or shortest path signal is not the signal to which the receiver synchronizes. When the receiver synchronizes to a reflected (longer path) signal, there will be a leading ghost image caused by the direct signal, or there will be a plurality of leading ghosts caused by the direct signal and other reflected signals of lesser delay than the reflected signal to which the receiver synchronizes. The parameters of the multipath signals—namely, the number of different-path responses, the relative amplitudes of the different-path responses, and the differential delay times between diffent ones of the different-path responses—vary from location to location and from channel to channel at a given location. These parameters may also be time-varying.

The visual effects of multipath distortion can be broadly classified in two categories: multiple images and distortion of the frequency response characteristic of the channel. Both effects occur due to the time and amplitude variations among the multipath signals arriving at the reception site. When the relative delays of the multipath signals with respect to the reference signal are sufficiently large, the visual effect is observed as multiple copies of the same image on the television display displaced horizontally from each other. These copies are sometimes referred to as "macroghosts" to distinguish them from "microghosts", which will be presently described. In the usual case in which the direct signal predominates and the receiver is synchronized to the direct signal, the ghost images are displaced to the right at varying position, intensity and polarity. These are known as trailing ghosts or "post-ghost" images. In the less frequently encountered case where the receiver synchronizes to a reflected signal, there will be one or more ghost images displaced to the left of the reference image. These are known as leading ghosts or "pre-ghost" images.

Multipath signals of relatively short delays with respect to the reference signal do not cause separately discernible copies of the predominant image, but do introduce distortion into the frequency response characteristic of the channel. The visual effect in this case is observed as increased or decreased sharpness of the image and in some cases loss of some image information. These short-delay, close-in or nearby ghosts are commonly caused by unterminated or incorrectly terminated radio-frequency transmission lines such as antenna lead-ins or cable television drop cables. In a cable television environment, it is possible to have multiple close-in ghosts caused by the reflections introduced by having several improperly terminated drop cables of varying lengths. Such multiple close-in ghosts are frequently referred to as "microghosts".

Long multipath effects, or macroghosts, are typically reduced by cancelation schemes. Short multipath effects, or microghosts, are typically alleviated by waveform equalization, generally by peaking and/or group-delay compensation of the video frequency response.

Since the characteristics of a transmitted television signal are known a priori, it is possible, at least in theory, to utilize such characteristics in a system of ghost signal detection and cancelation. Nevertheless, various problems limit this approach. Instead, it has been found desirable to transmit repeatedly a reference signal situated, for example, in a section of the TV signal that is currently unused for video purposes and to utilize this reference signal for the detection of ghost signals prior to arranging for the suppression of ghost signals. Typically, lines in the vertical blanking interval (VBI) are utilized. Such a signal is herein referred to as a Ghost Canceling Reference (GCR) signal; and a variety of different GCR signals have been described in patents and other technical publications.

Bessel pulse chirp signals are used in the GCR signal recommended for adoption as a standard for television broadcasting in the United States of America. The distribution of energy in the Bessel pulse chirp signal has a flat frequency spectrum extending continuously across the video frequency band. The chirp starts at the lowest frequency and sweeps upward in frequency therefrom to the 4.1 MHz highest frequency. The chirps are inserted into the first halves of selected VBI lines, the $19^{th}$ line of each field currently being preferred. The chirps, which are on +30 IRE pedestals, swing from −10 to +70 IRE and begin at a prescribed time after the trailing edges of the preceding horizontal synchronizing pulses. The chirp signals appear in an eight-field cycle in which the first, third, fifth and seventh fields have a polarity of color burst defined as being positive and the second, fourth, sixth and eighth fields have an opposite polarity of color burst defined as being negative. The initial lobe of a chirp signal ETP that appears in the first, third, sixth and eighth fields of an eight-field cycle swings upward from the +30 IRE pedestal to +70 IRE level. The initial lobe of a chirp signal ETR that appears in the second, fourth, fifth and seventh fields of the eight- field cycle swings downward from the +30 IRE pedestal to −10 IRE level and is the complement of the ETP chirp signal.

The strategy for eliminating ghosts in a television receiver relies on the transmitted GCR signal suffering the same multipath distortions as the rest of the television signal. Circuitry in the receiver can then examine the distorted GCR signal received and, with a priori knowledge of the distortion-free GCR signal, can carry out a procedure known as channel characterization, in which the magnitudes, phases and occurrence times of the ghosts are determined respective to the reference signal. This is done by calculating the discrete Fourier transform (DFT) of the ghosted GCR signal and dividing the terms of that DFT by the corresponding terms of the DFT of the non-ghosted GCR signal known a priori, thus to generate the respective terms of the DFT of the channel. These DFTs are all in the time domain. The occurrence times of the ghosts and the amplitudes of their in-phase components are then used for calculating the adjustable weighting coefficients of a digital filter through which the composite video signal from the video detector is passed to supply a response in which ghosts are suppressed, which filter is referred to as a "ghost-cancelation" filter in this specification. The terms of the channel DFT are analyzed to determine the largest of them, which is replaced by zero in a modified DFT. The other terms are reversed in sign in the modified DFT, which is the desired DFT of the ghost-cancelation filter. The weighting coefficients of this ghost-cancelation filter are adjusted to approximate this desired DFT as closely as possible. The GCR signals can be further used for calculating the adjustable weighting coefficients of an equalization filter connected in cascade with the ghost-cancelation filter, for providing an essentially flat frequency spectrum response over the complete reception path through the transmitter vestigial-sideband amplitude-modulator, the transmission medium, the television receiver front-end and the cascaded ghost-cancelation and equalization filters.

The inventors have configured the ghost-cancelation filter as a cascade connection of a recursive digital filter principally used for cancelling post-ghosts and a non-recursive digital filter principally used for cancelling pre-ghosts. A recursive digital filter has an infinite impulse response, so is commonly referred to as an IIR filter. A non-recursive digital filter has an finite impulse response, so is commonly referred to as an FIR filter. One may seek to carry out adjustments to the IIR and FIR filters independently, directly relating the smaller terms of the DFT of said reception channel later in time than the largest term of the DFT of said reception channel to tap weights in the IIR filter, and directly relating the smaller terms of the DFT of said reception channel earlier in time than the largest term of the DFT of said reception channel to tap weights in the FIR filter. Directly relating the DFT terms to tap weights in the filters is a relatively simple computational procedure that was followed in the prior art when just post-ghosts or just pre-ghosts were being corrected.

Suppose, then, those portions of the channel characterization results descriptive of post-ghosts are used to adjust the filtering coefficients of just the IIR filter principally used for cancelling post-ghosts. Suppose further those portions of the channel characterization results descriptive of pre-ghosts are used to adjust the filtering coefficients of just the FIR filter principally used for cancelling pre-ghosts. When the IIR filter adjustments and FIR filter adjustments are carried out independently, ghost suppression is good when there are only post-ghosts and not too many of them. Ghost suppression is also good when there are only pre-ghosts and not too many of them.

Ghost suppression tends to be poor, however, when there are both post-ghosts and pre-ghosts of appreciable energy, even though the ghosts are few in number. The problem of too many post-ghosts and of too much differential delay between those ghosts can be solved by using an IIR filter with a greater number of taps with non-zero weighting and an increased number of programmable bulk delay devices. The problem of too many pre-ghosts and of too much differential delay between those ghosts can be solved by using a FIR filter of more complex design. When there are both post-ghosts and pre-ghosts to be suppressed, however, the problem of poor ghost suppression is not solved by dealing with the post-ghost problem and with the pre-ghost problem separately.

The inventors observe that ghost suppression is good when conditions are such that one of the cascaded filters has substantially no effect on the response of the other. The problem is that when there are both post-ghosts and pre-ghosts to be suppressed, the IIR and FIR filter responses are interactive with each other. By way of illustrating this interaction, suppose the IIR filter precedes the FIR filter in their cascade connection with each other. For each post-ghost cancelled by the IIR filter, a pre-ghost supplied to that filter will give rise to a ghost of the pre-ghost. The ghost of the pre-ghost is delayed from the pre-ghost by the same interval as the suppressed post-ghost was delayed from the predominant signal.

SUMMARY OF THE INVENTION

In ghost-suppression circuitry preferred for use with the methods of the invention, ghosts accompanying composite video signal from the video detector in a television receiver or a video tape recorder are suppressed in the cascade connection of three digital filters having filtering parameters adjustable in response to digital programming signals: one, an IIR filter used for suppressing trailing macroghosts, or post-ghosts; another, an FIR filter used for suppressing leading macroghosts, or pre-ghosts; and still another, a further FIR filter used for suppressing microghosts, or "equalizing" reception channel response. The filtering parameters of these three digital filters are calculated in the methods embodying the invention in various of its aspects.

These methods each include data acquisition and channel characterization steps followed by a decision step comparing the most recent set of channel characterization results with the next most recent set of channel characterization results to determine whether stable ghosting conditions obtain. This decision step loops the method back through the data acquisition and channel characterization steps until stable ghosting conditions obtain, so the most recent set of channel characterization results can be relied upon to support accurate calculations in subsequent steps of calculating the filtering parameters for the IIR filter used for suppressing trailing macroghosts and the FIR filter used for suppressing leading macroghosts.

After the steps of calculating the filtering parameters for the filters used for suppressing macroghosts, each of these methods performs a step of calculating the filtering parameters for the FIR filter used for suppressing microghosts. This step is followed by further data acquisition and further channel characterization steps, followed by a decision step comparing the most recent set of further channel characterization results with the next most recent set of further channel characterization results to determine whether they are substantially the same. If the sets of further channel characterization results are substantially the same, either method loops back to the further data acquisition step; if the sets differ appreciably, either method resets the adjustable filtering parameters for the filters to initial values and the method restarts automatically.

Two methods embodying the invention in somewhat different aspects each perform the initial calculations of the adjustable filtering parameters of the IIR filter used for suppressing trailing macroghosts independently of the initial calculations of the adjustable filtering parameters of the FIR filter used for suppressing leading macroghosts. This initially-separable calculation technique reduces the amount of calculations considerably over previously known techniques, even taking into account the subsequent calculations that are sometimes needed to correct the separable calculations. In one preferred method a successive-approximation method, subsequent calculations to provide this correction are arranged for by looping back to the data acquisition and channel characterization steps and recalculating the adjustable filtering parameters of the filters used for suppressing macroghosts until the macroghosts are reduced below a prescribed threshold level. In an other method, which does not depend on successive approximations, the subsequent calculations to provide this correction are based on the fact that the DFT of the correction corresponds in prescribed manner to the DFT of the convolution of the frequency responses of the filters used for suppressing macroghosts.

Figure 2:
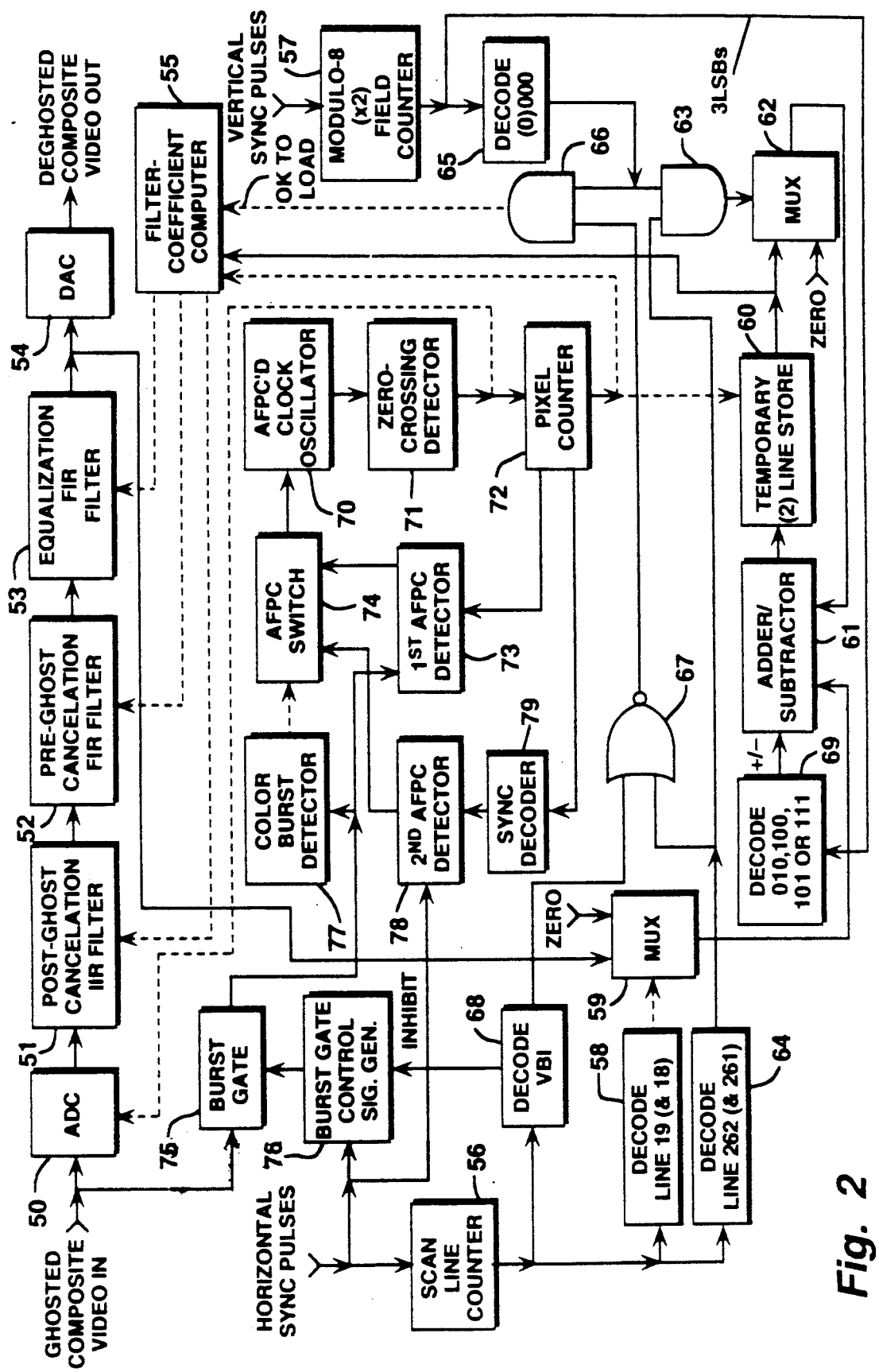
FIG. 2 is a schematic diagram of ghost-suppression circuitry suitable for inclusion in the FIG. 1 combination, which ghost-suppression circuitry includes GCR signal acquisition circuitry.
Figure 4:
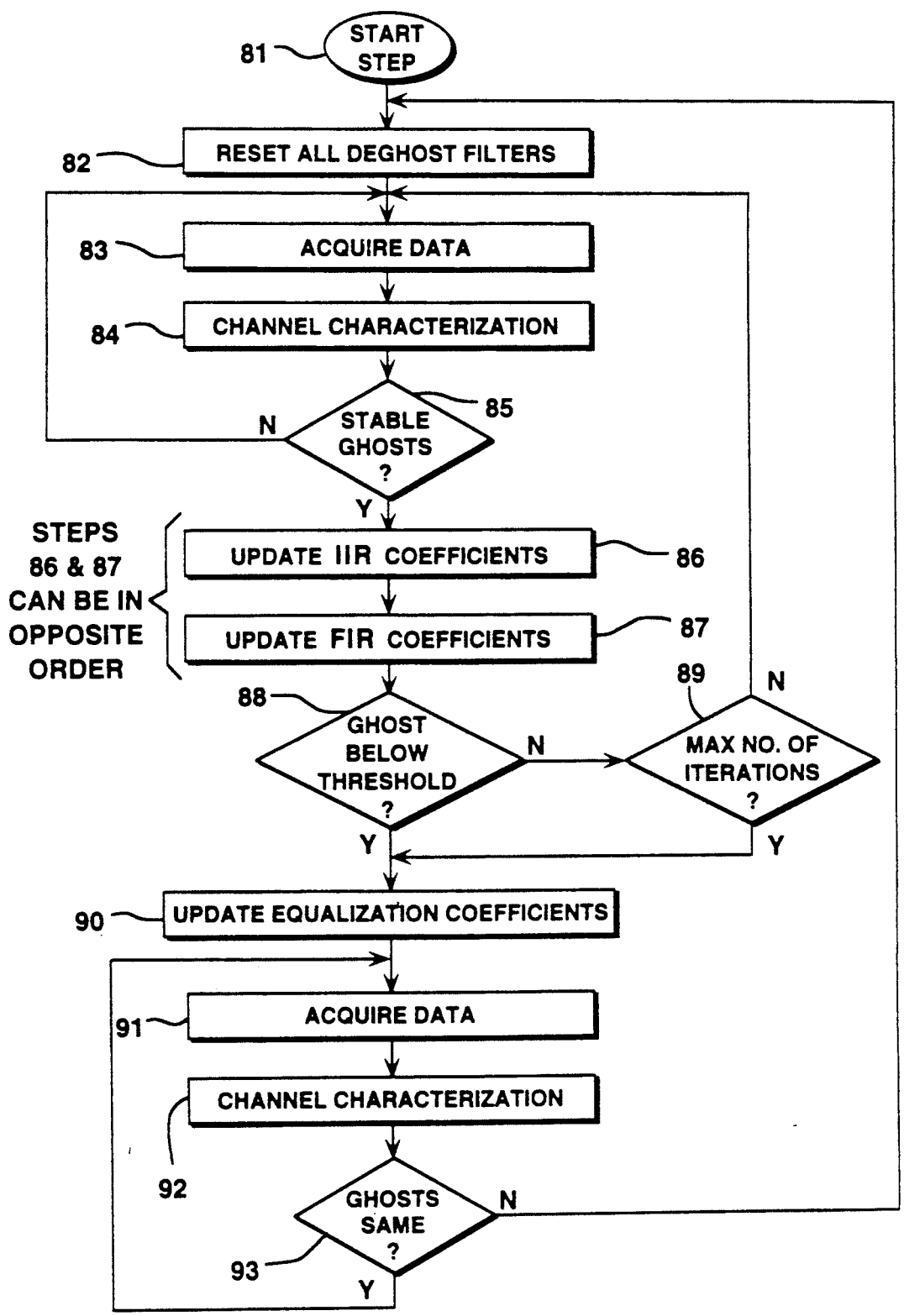
Figure 5:
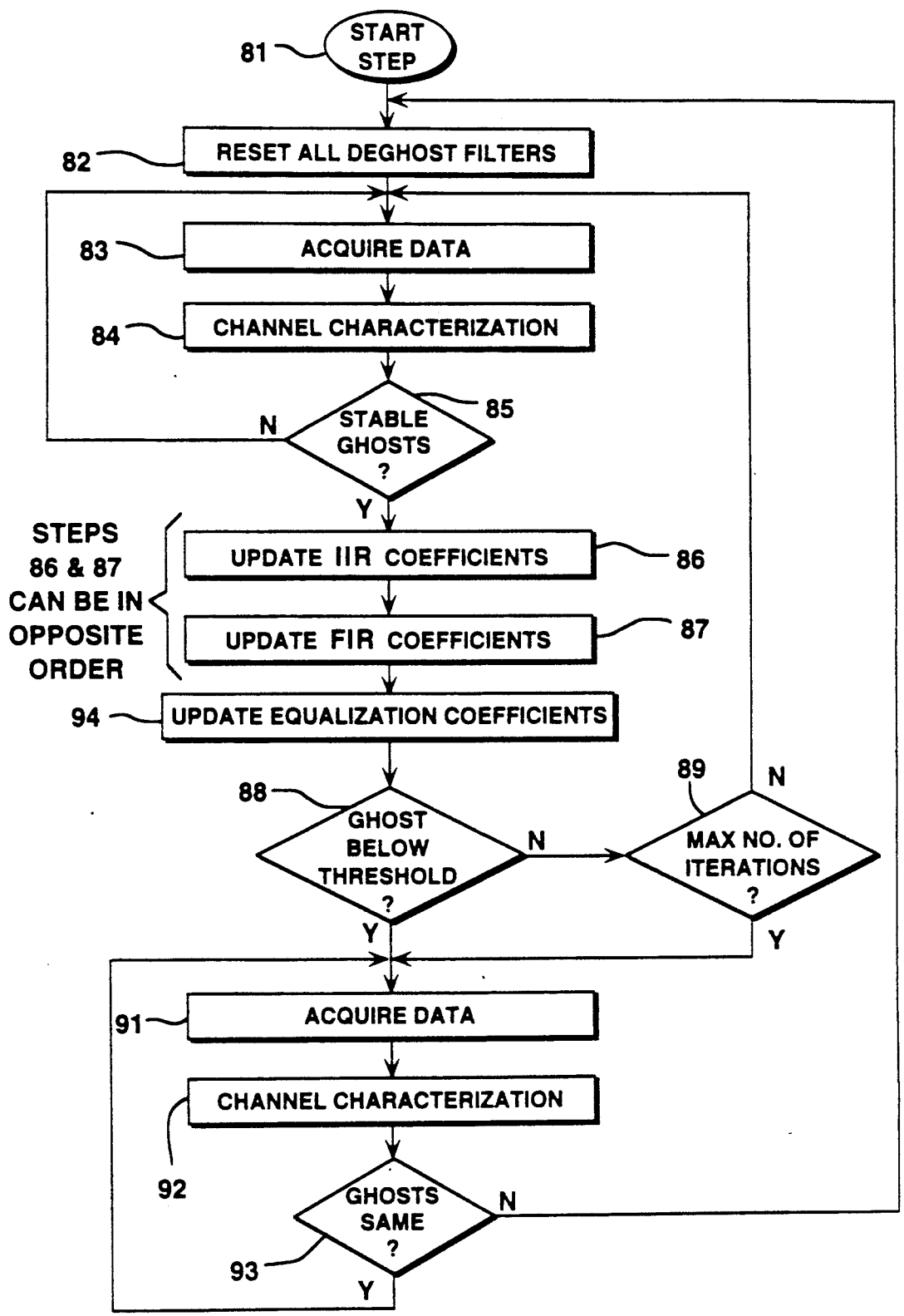
Figure 6:
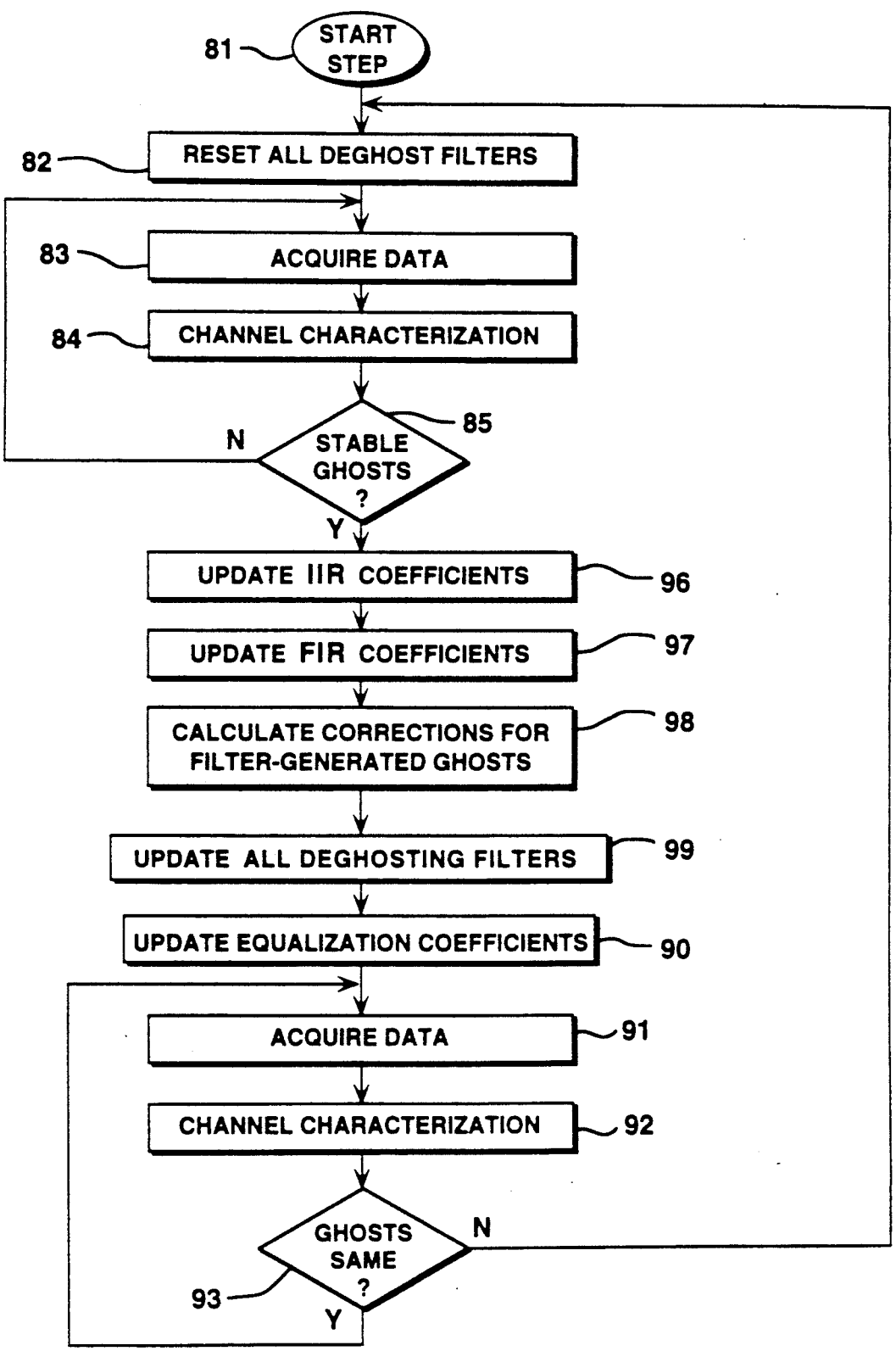

Each of FIGS. 4, 5 and 6 is a flow chart of one of two alternative deghosting methods that can be used with the FIG. 2 deghosting circuitry, which method embodies the invention in one of its aspects.

Figure 7:
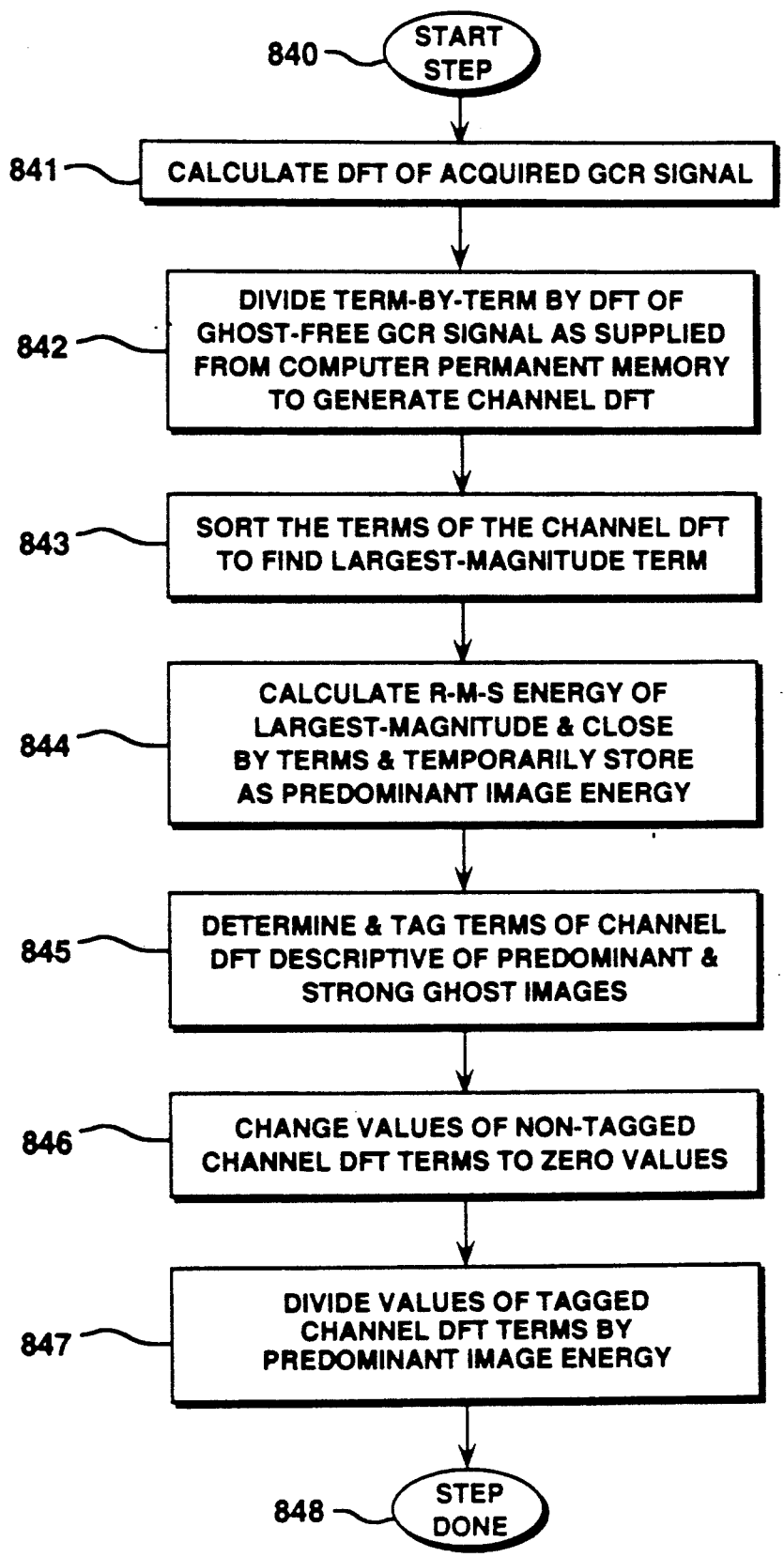

FIG. 7 is a flow chart of substeps that can be performed in carrying out step 84 of the FIG. 4, FIG. 5 or FIG. 6 method.

Figure 8:
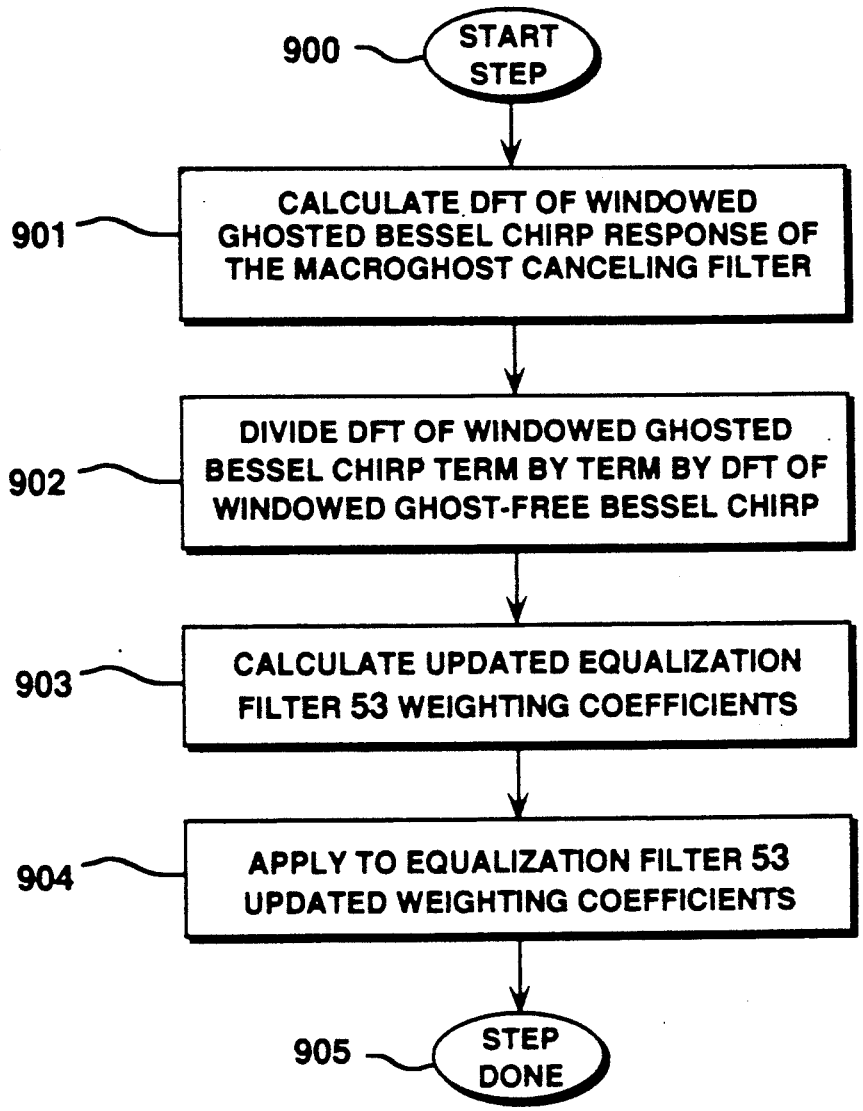

FIG. 8 is a flow chart of substeps that can be performed in a first way of carrying out the step 90 of the FIG. 4 method or of the FIG. 6 method.

Figure 9:
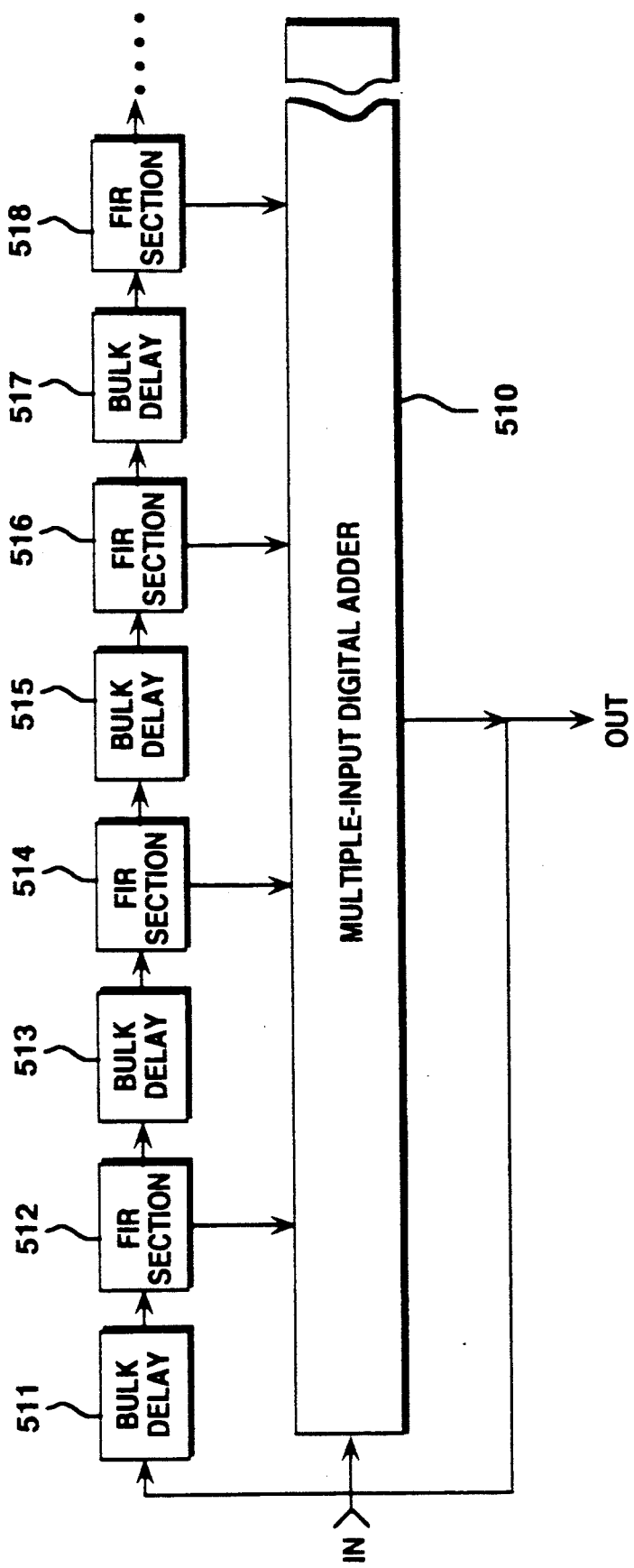

FIG. 9 is a schematic diagram of one way of implementing a sparsely weighted IIR filter, as can be used in the methods of the invention for suppressing trailing macroghosts, or post-ghosts.

Figure 10:
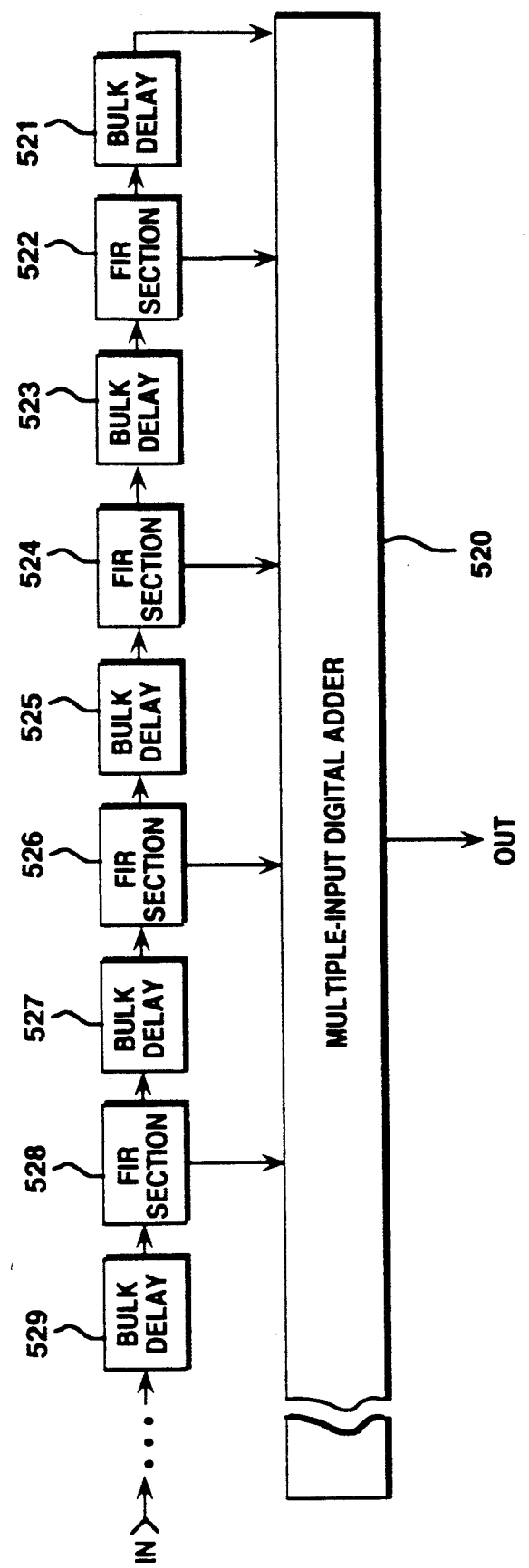

FIG. 10 is a schematic diagram of one way of implementing a sparsely weighted FIR filter, as can be used in the methods of the invention for suppressing leading macroghosts, or pre-ghosts.

Figure 11:
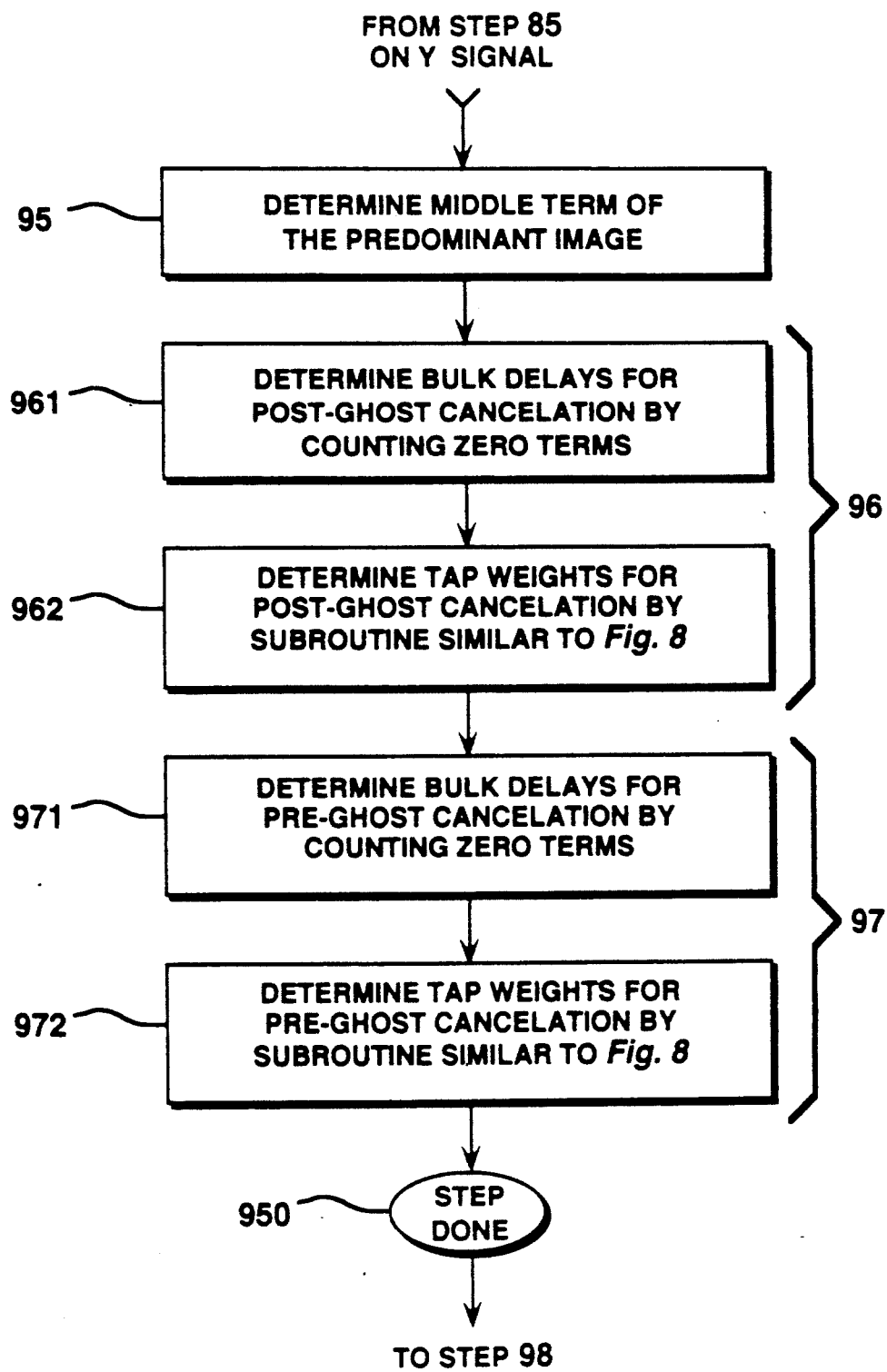

FIG. 11 is a more detailed flow chart of substeps that can be performed for calculating the filtering parameters for ghost-canceling filters formed from the cascade connection of a sparsely weighted IIR filter and a sparsely weighted FIR filter, when carrying out the steps 96 and 97 of the FIG. 5 method.

Figure 12:
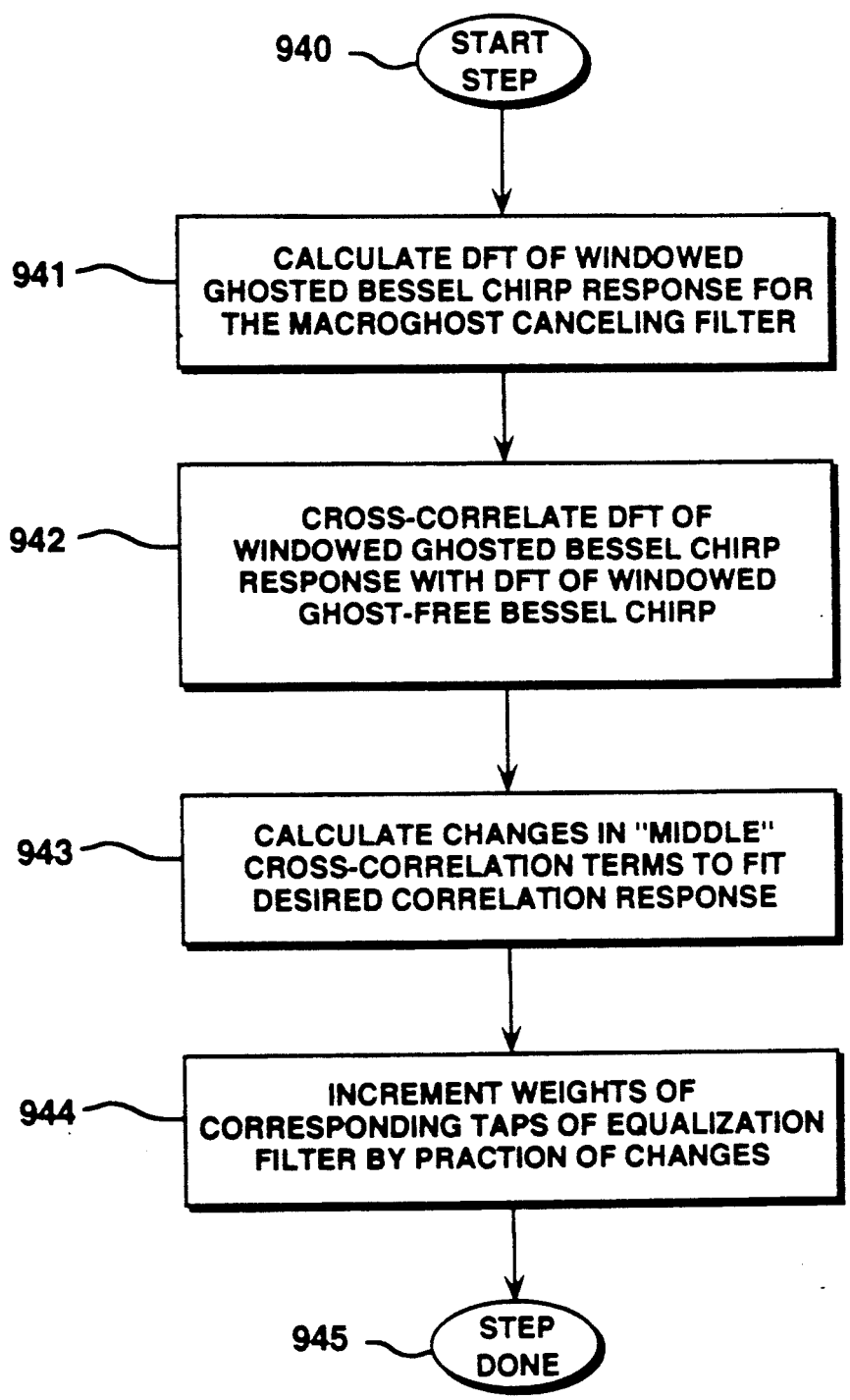

FIG. 12 is a flow chart of substeps that can be performed in carrying out the step 94 of the FIG. 5 method.

Figure 13:
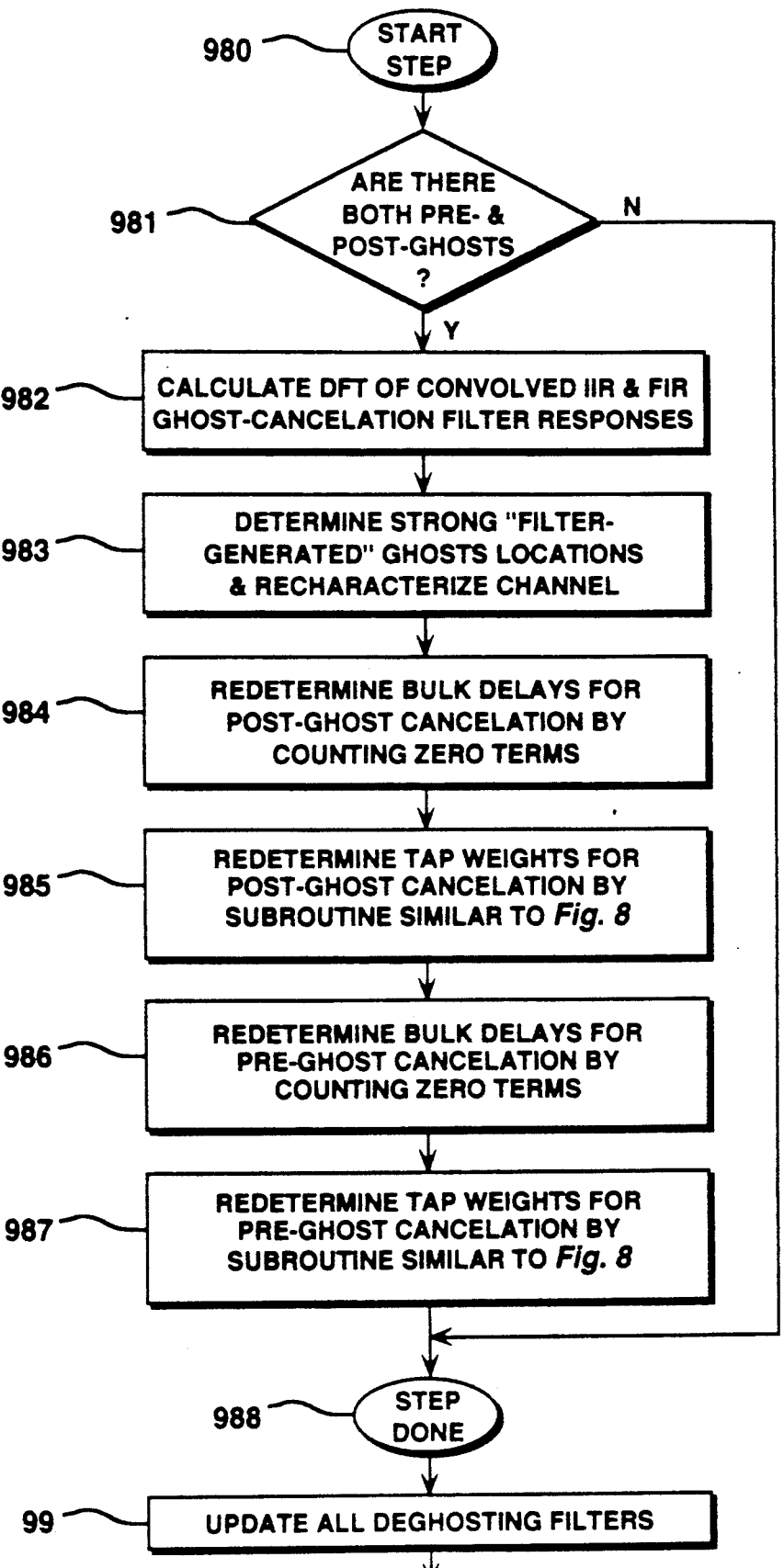

FIG. 13 is a more detailed flow chart of substeps that can be performed for calculating corrections for "filter-generated" ghosts, when carrying out the step 98 of the FIG. 5 method.

Figure 1:
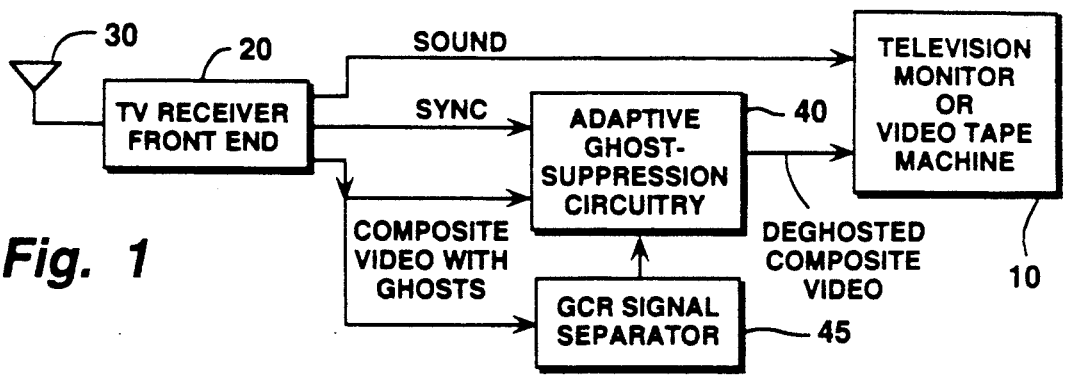
FIG. 1 is a general schematic diagram of a system, comprising a TV receiver or video tape recorder with ghost-suppression circuitry in which the methods of the invention may be usefully employed.
Figure 3:
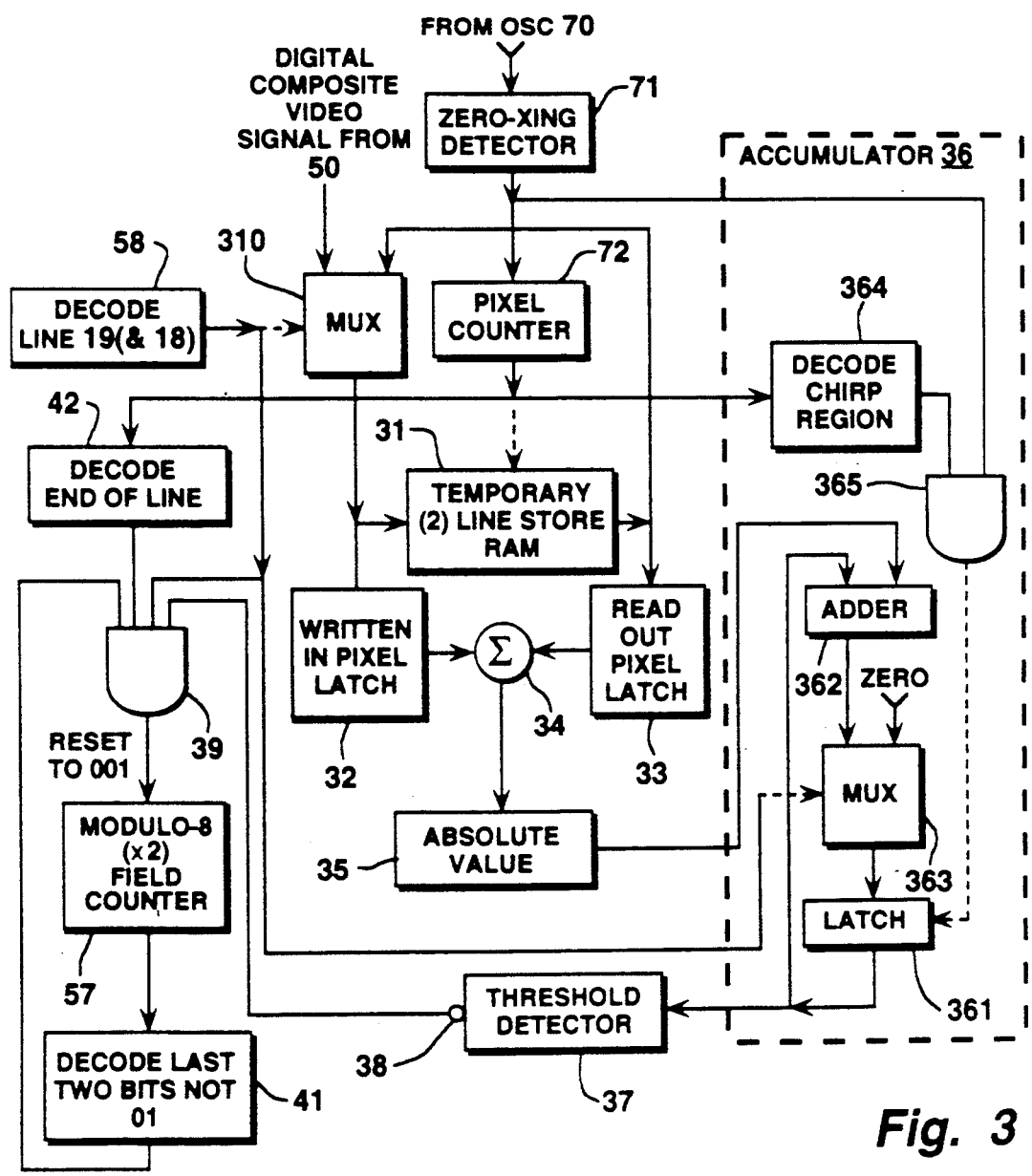
FIG. 3 is a schematic diagram of circuitry for resetting a modulo-eight field counter in the FIG. 2 ghost-suppression circuitry.

Various modifications that can be made to the circuitry shown in FIGS. 2 and 3 are noted within parentheses in those figures.

DETAILED DESCRIPTION

The term "television set" is used in this specification to describe a television receiver front end with accompanying kinescope, power supply for a kinescope, deflection circuitry for a kinescope, portions of a television receiver associated with converting the composite video signal to the color signals for driving a kinescope, loudspeaker(s), sterephonic sound detector or audio amplication circuitry. The conventional video cassette recorder (VCR) includes a television receiver front end without those accompanying further items, which are termed a "television monitor" in this specification and the accompanying drawing. If in a VCR and TV-set combined into a single piece of apparatus called a "combo" one desires the capability simultaneously to record a program received on one channel and to display a program received on a different channel, two TV receiver front ends have to be provided, one for the video tape machine with recording capability and one for the television receiver with image displaying capability. As taught in U. S. patent application Ser. No. 07/955,016 filed for Chandrakant B. Patel and Min Hyung Chung on Oct. 1, 1992, entitled VIDEO TAPE RECORDER WITH TV RECEIVER FRONT END & GHOST-SUPPRESSION CIRCUITRY, and assigned to Samsung Electronics Company, Limited, it is preferable to include respective sets of ghost-cancelation circuits after the video detectors of each of these TV receiver front ends, although one microcomputer can be used for calculating the filtering parameters for both sets of ghost-cancelation circuits.

Raster-scanning maps the two-dimensional spatial domains of successive image fields, which form a three-dimensional domain in space and time, into the one-dimensional time domain of a video signal. Television engineers refer to filter networks that combine various sample values of the video signal by names suggestive of the results of such combining in the three-dimensional domain in space and time. A filter network combining the sample values of the video signal which describe picture elements or "pixels" arrayed along the scan line of an image field is referred to as a "horizontal spatial filter". A filter network combining the sample values of the video signal separated in time by scan line intervals, which samples describe pixels that are arrayed transversely to the scan lines of an image field, is referred to as a "vertical spatial filter". A filter network combining the values of samples of the video signal separated in time by scan line intervals, which samples describe pixels that appear in the same position in successive image fields or frames, is referred to as a "temporal filter"—i.e., a filter that operates in the time dimension rather than either of the spatial dimensions. A temporal filter may combine pixels for only one position in space, but commonly combines correspondingly-located pixels from a plurality of frames for each of several positions in space, E.g., in a line-averaging filter correspondingly-located pixels are averaged for each of the positions along a scan line. By analogy, as used in this specification or the claims which follow, the term "temporal filter" is to be understood to include filters for combining corresponding "pixels" of respective scan lines selected from consecutive fields which scan lines include GCR signals. This particular type of temporal filter is referred to as a "GCR-signal-averaging filter" in this specification and the claims which follow, although averaging is not done on an actual-value basis, but only after correcting to a standard polarity of chirp.

Memories providing temporary storage of a number of samples corresponding to pixel positions in a scan line of video signal are referred to in this specification as "temporary 1-line stores" even though such stores may in fact be included in accumulators that accumulate several lines on a pixel-by-pixel basis. Similarly, memories providing temporary storage of a number of samples corresponding to pixel positions in two consecutive scan lines of video signal are referred to in this specification as "temporary 2-line stores" even though such stores may in fact be included in accumulators that accumulate several pairs of consecutive lines on a pixel-by-pixel basis. The inclusion of several temporary 1-line stores or temporary 2-line stores within a single banked memory is, of course, within the scope of the invention disclosed in this specification and its accompanying drawing.

A television receiver front end 20, in response to a radio-frequency television signal received thereby, supplies a sound signal and a composite video signal to apparatus 10, which apparatus 10 may be a television monitor or may be a video tape machine receiving these signals for recording. The video tape machine having recording capability may be a video cassette recorder (VCR) of VHS, super-VHS or Betamax type. By way of further example, the video tape machine may be an improved VHS recorder of the type described in U.S. Pat. No. 5,113,262 issued May 12, 1992 to C. H. Strolle et alii and entitled "VIDEO SIGNAL RECORDING SYSTEM ENABLING LIMITED BANDWIDTH RECORDING AND PLAYBACK".

The radio-frequency television signal may be broadcast over the air and then captured by an aerial television antenna 30 for application to the television receiver front end 20, as shown by way of example. Alternatively, the radio-frequency television signal can be provided over cable by community-antenna or other television cable service. The television receiver front end 20 includes the portions of a conventional television receiver normally employed in combination, either with a television monitor for displaying the video image, or with a video tape machine having recording capability. These portions generally include a radio-frequency amplifier, a down converter or "first detector", at least one intermediate-frequency amplifier, a video detector or "second detector", and a sound demodulator (frequently of intercarrier type). The television receiver front end 20 further includes separation circuitry for horizontal synchronizing pulses and for vertical synchronizing pulses.

The sound signal from the sound demodulator in the television receiver front end 20 is demodulated from a frequency-modulated sound carrier, as heterodyned to intermediate frequency by the down converter. Before its demodulation the frequency-modulated sound carrier is limited to remove amplitude variations therein, and the capture phenomenon suppresses responses to ghosts in the sound signal from the sound demodulator. Accordingly, the sound signal from the sound demodulator in the television receiver front end 20 is supplied directly to the apparatus 10, there to be utilized in the conventional manner.

The composite video signal from the video detector in the television receiver front end 20 is supplied to ghost-suppression circuitry 40 to have the accompanying ghosts removed or suppressed. The ghost-suppression circuitry 40, which can be any one of the types known to the art, includes adaptive filter circuitry and a computer for calculating the filter parameters for that adaptive filter circuitry. The resulting "deghosted" composite video signal is supplied from the ghost-suppression circuitry 40 to the apparatus 10, there to be utilized in the conventional manner. A GCR-signal separator (or GCR-signal acquisition circuitry) 45 selects a GCR signal and attendant ghosted replicas thereof from the composite video signal from the video detector in the television receiver front end 20. The GCR-signal separator 45 supplies the ghosted GCR signal it separates to the computer in the ghost-suppression circuitry 40, in which computer the ghosted GCR signal is correlated with a priori information concerning a ghost-free GCR signal as a basis for calculating the filter parameters for the adaptive filter circuitry in the ghost-suppression circuitry 40. In the invention the GCR-signal separator 45 takes the form of GCR-signal acquisition circuitry that averages on a pixel-by-pixel basis the Bessel chirps as extracted from the GCR signals in a number of consecutive fields. The GCR signals including ETP chirps form a first set of GCR signals, and the GCR signals including ETR chirps form a second set of GCR signals.

Rapidly changing multipath conditions occur at times—such as when one or more aircraft fly over the television receiver antenna 30, for example, causing fast-changing selective fading referred to as "aircraft flutter". The filter-coefficient computer within the ghost-suppression circuitry 40 generally is one with sufficient speed to compute updated filter parameters within a field time. However, the multipath conditions may change so rapidly during aircraft flutter, that updated filter parameters calculated just from one ghosted GCR signal selected from the $19^{th}$ line of a field are no longer appropriate at the later time in the field when the calculations of those filter parameters are completed. When in accordance with the invention noise-reduced GCR signals are generated by averaging the GCR signals from several consecutive fields, the calculation of updated filter parameters is even less able to track the rapidly changing multipath conditions. Accordingly, currently, it is most practical to determine the filter parameters for the ghost-suppression circuitry 40 only after the rapidly changing multipath conditions, have passed and static multipath conditions are re-established.

FIG. 2 illustrates one form the ghost-suppression circuitry 40 can take, which is suited for use with the Bessel-chirp GCR signals being inserted into the $19^{th}$ VBI lines of each field. Composite video signal, supplied to the FIG. 2 ghost-suppression circuitry from the television receiver front end 20, is digitized by an analog-to-digital converter 50. The ADC 50 typically will supply eight-parallel-bit samples of digitized composite video signal. The digitized composite video signal is applied as input signal to a cascade connection of a post-ghost cancelation filter 51, which is an adaptive filter of IIR type; a pre-ghost cancelation filter 52, which is an adaptive filter of FIR type; and an equalization filter 53, which is an adaptive filter of FIR type.

The output signal of the filter cascade is a digital deghosted composite video signal, which is converted to an analog deghosted composite video signal by a digital-to-analog converter 54. The analog deghosted composite video signal is supplied to the apparatus 10. The digital-to-analog converter 54 is dispensed with in advanced designs where the apparatus 10 is of a type utilizing digital, rather than analog signals.

A filter coefficient computer 55 computes the weighting coefficients for the adaptive filters 51, 52 and 53. These weighting coefficients are binary numbers, which the filter-coefficient computer 55 writes into registers within the digital filters 51, 52 and 53. In the IIR filter 51 the weighting coefficients stored in registers thereof are used as multiplier signals for digital multipliers receiving the filter output signal with various amounts of delay as multiplicand signals. The product signals from the digital multipliers are algebraically combined in digital adder/subtractor circuitry to generate the IIR filter response. In each of the FIR filters 52 and 53 the weighting coefficients stored in registers thereof are used as multiplier signals for digital multipliers receiving the filter input signal with various amounts of delay as multiplicand signals. In each of the FIR filters 52 and 53 the product signals from the digital multipliers are algebraically combined in digital adder/subtractor circuitry to generate the weighted summation response characteristic of an FIR filter.

Pre-ghosts occurring in off-the-air reception can be displaced as much as 6 microseconds from the direct signal, but typically displacements are no longer than 2 microseconds. In cable reception direct off-the-air pickup can precede the cable-supplied signal by as much as 30 microseconds. The number of taps in the FIR filters 52 and 53 depends on the range over which ghost suppression is sought. To keep filter costs within commercial constraints, typically the FIR filter 52 has around 64 taps for suppressing ghosts with as much as 6 microseconds displacement from the direct signal. The FIR filter 53 used for frequency equalization need only have 32 taps or so. The FIR filter 53 is typically required to correct in-band video response that can be rolled off by as much as 20 dB at 3.6 MHz, but roll-off at 3.6 MHz is usually less than 10 dB. The roll-off is usually attributable to incorrect orientation of the antenna in off-the-air reception. The cascaded FIR filters 52 and 53 are replaced in some designs by a single FIR filter having about 80 taps.

Typically, the range for post-ghosts extends to 40 microseconds displacement from the direct signal, with 70% or so of post-ghosts occurring in a subrange that extends to 10 microseconds. The IIR post-ghost cancelation filter 51 required for suppressing post-ghosts over the full range can be as many as 600 taps long. However, since post-ghosts usually are non-overlapping and occur at discrete displacements, the weighting coefficients for many of these taps of the filter 51 are likely to be zero-valued or nearly so. The taps requiring weighting coefficients of value significantly more than zero are clumped together in groups of ten or less except where there are overlapping ghosts. It is desirable, from the standpoint of economy of hardware, to use only as many digital multipliers as there are expected to be weighting coefficients of value significantly more than zero. Accordingly, the tapped delay line in the IIR filter 51 is usually designed as a cascade connection of ten-tap-or-so delay lines interspersed with programmable "bulk" delay devices, making filter 51 what is sometimes termed a "sparse-weighting" filter. The ten-tap-or-so delay lines furnish signals to the digital multipliers for weighting. The incremental delay between successive taps of each of these ten-tap-or-so delay lines is a single pixel interval. The programmable bulk delay devices each comprise various length delay lines the chaining together of which can be controlled in response to control signals expressed as binary numbers. Such a sparse-weighting filter will include registers for the binary numbers specifying the delays of the programmable delay devices, the contents of which registers are also controlled by the filter-coefficient computer 55.

The FIR pre-ghost cancelation filter 52 can also be made a sparse-weighting filter and this specification is written to take this possibility into account. Practically speaking, pre-ghosts are generally close-in ghosts and do not precede the principal image much in time, so the FIR pre-ghost cancelation filter 52 will usually not be of sparse-weighting design.

Consider now the means by which the filter-coefficient computer 55 is supplied ghosted GCR signals from the television receiver front end 20. Horizontal and vertical synchronizing pulses are received from the front end 20. The horizontal sync pulses are counted by a nine-stage digital counter 56, denominated "scan line counter", periodically reset by vertical sync pulses; and the vertical sync pulses are counted modulo-8 by a three-stage digital counter counter 57, denominated "field counter". These counts are available to the filter-coefficient computer 55 for use in timing its operations, although connections for furnishing these counts to the computer 55 are left out of FIG. 2 to reduce its complexity. A decoder 58 responds to the scan line count from the line counter 56 being nineteen, corresponding to the scan line in each field containing GCR signal, to condition the output signal of a multiplexer 59 to correspond to the digitized composite video signal from the output of the cascade connection of filters 51, 52 and 53 supplied as a first input signal thereto, rather than to a wired zero supplied as a zeroeth input signal thereto.

The filter-coefficient computer 55 has control over the operating parameters of the filters 51, 52 and 53. So, by manipulation of those operating parameters the computer 55 can select the point in the cascade connection of these filters 51–53 from which GCR signal is separated by the GCR signal separator. (The GCR signal separator comprises the elements 58 and 59 in FIG. 2 and the elements 58 and 101–108 in FIG. 5.) For example, the input signal applied to the cascade connection of the filters 51–53 can be selected to the GCR signal separator by the computer 55 by setting the weighting coefficients of the recursive paths in the IIR filter 51 to zero values, so the output response of the IIR filter 51 is determined solely by its input signal; by setting to zero all the weighting coefficients except a unity-valued one defining the kernel center in the FIR filter 52; and by setting to zero all the weighting coefficients except a unity-valued one defining the kernel center in the FIR filter 53. Alternatively, one can make circuit arrangements that will implement more direct and faster selection of the point in the cascade connection of the filters 51–53 from which GCR signal is separated. The fact that the point in the cascade connection of the filters 51–53 from which GCR signal is separated can be selected is important to understand, since this fact will aid in understanding the implementation of the procedure for calculating the variable parameters of the filters 51–53, which is explained further on in this specification with reference to the FIG. 4 flow chart.

A random-access memory with read-then-write capability provides a temporary (scan) line store 60 in FIG.

2, which store 60 may be replaced by serial memory in alternative embodiments of the ghost-suppression circuitry. This temporary line store 60 is connected in an arrangement for accumulating the 19$^{th}$-VBI-line GCR signals on a per pixel basis for eight successive fields, in a temporal filtering operation that separates the Bessel-chirp information from other information occurring during those 19$^{th}$ VBI scan lines. Elements 59-69 in the FIG. 2 circuitry combine to form a GCR-signal averaging filter that carries out this temporal filtering operation, which correlates the Bessel-chirp information occurring during those 19$^{th}$ VBI scan lines to provide improved signal-to-noise ratio, as compared to using gating simply to separate the Bessel-chirp information from 19$^{th}$ VBI scan lines as it occurs. When the corresponding pixels of the eight GCR signals have been accumulated during the 19$^{th}$ line of FIELD 000, the eighth and last field of the eight-field sequence, the separated Bessel-chirp information is serially loaded one pixel at a time into a register of the filter-coefficient computer 55 during any line of FIELD 000 after its 19$^{th}$ and before the line store 60 is cleared of data. In FIG. 2 the line store 60 is cleared of data during the last line of the last field of the eight-field sequence, but this clearance can take place during any line of FIELD 000 after the separated Bessel-chirp information is written into a register of the filter-coefficient computer 55. The transfer of accumulated data from the line store 60 to the computer 55 and the subsequent clearing of the accumulated data from the line store 60 can also take place during any two of the 1$^{st}$ through 18$^{th}$ scan lines of FIELD 001.

More particularly, the temporary line store 60 has to have the capability of storing a full scan line of sixteen-parallel-bit samples, assuming that it is to accumulate (on an alebraic or signed basis) eight lines of eight-parallel-bit samples of digitized composite video signal supplied from the ADC 50 via the cascaded filters 51-53. Two's complement arithmetic is preferred for this signed, algebraic summation. In partial implementation of the arrangement for operating the temporary line store 60 as a signed accumulator for GCR signals, a digital adder/subtractor 61 supplies a sixteen-parallel-bit output signal to the temporary line store 60 as its write input signal. The digital adder/subtractor 61 receives as a first input thereto the output signal of a multiplexer 62, which normally corresponds to the readout from the temporary line store 60 received as the zeroeth input of the multiplexer 62. The digital adder/subtractor 61 receives as a second input thereto the eight-parallel-bit output signal of the multiplexer 59 together with eight wired ZEROs as a sign-bit extension.

A decoder 69 decodes the modulo-eight field count being one, three, six, or zero (i.e., eight) to furnish a logic ZERO to the digital adder/subtractor 61 to condition it to add its input signals. The decoder 69 decodes the modulo-eight field count being two, four, five, or seven to furnish a logic ONE to the digital adder/subtractor 61 to condition it subtract its second input signal (supplied from the multiplexer 59) from its first input signal (supplied from the multiplexer 62). This arrangement accumulates in the temporary line store 60 the following function:

(FIELD 001 line 19) − (FIELD 010 line 19) +
(FIELD 011 line 19) − (FIELD 100 line 19) −

-continued (FIELD 101 line 19) + (FIELD 110 line 19) −
(FIELD 111 line 19) + (FIELD 000 line 19).

During the last line of the eighth field of each sequence of eight fields, the normally ZERO control signal to the multiplexer 62 is caused to be a ONE. This ONE conditions the multiplexer 62 to furnish an output signal corresponding to a first input thereto, which is an arithmetic zero comprising sixteen parallel bits of wired ZEROs. This results in the resetting of the accumulation result in the temporary line store 60 to arithmetic zero. The control signal for the multiplexer 62 is shown in FIG. 2 as being generated by a two-input AND gate 63. A decoder 64 decodes the count from the scan line counter 56 corresponding to the last line of the current field to generate one of the input signals to the AND gate 63. A decoder 65 decodes the modulo-eight field count from the counter 57 to generate the other of the input signals to the AND gate 63. The eighth field of each sequence of eight fields generates a 000 modulo-eight count from the field counter 57. Both the input signals to the AND gate 63 are ONE only during the last line of the eighth field of each sequence of eight fields, during which line the AND gate 63 supplies a ONE to the multiplexer 62 as its control signal, causing the accumulation result stored in the temporary line store 60 to be reset to arithmetic zero.

A two-input AND gate 66 supplies a ONE to the filter-coefficient computer 55 when the accumulation result stored in the temporary line store 60 is available for transfer into a ghosted Bessel-chirp register within the internal memory of the computer 55. The output signal of the decoder 65 is one of the input signals to the AND gate 66 and is ONE only during the eighth field of each sequence of eight fields. A two-input NOR gate 67 generates the other of the input signals to the AND gate 66. The NOR gate 67 responds to the output signal of the decoder 64, which detects the last line of a field in the count from line counter 56, and to the output signal of a decoder 68, which detects the vertical blanking interval proceeding from the count from line counter 56. Accordingly, the NOR gate 67 output signal is ONE except during the vertical blanking interval or during the last line of a field. So, the accumulation result stored in the temporary line store 60 is available for transfer into the internal memory of the computer 55 any time during the eighth field of each sequence of eight fields except during its last line or during vertical blanking interval.

The clocking for timing pixel sampling by the analog-to-digital converter 50 and the addressing of the temporary line store 60 will now be considered. An oscillator 70 that has automatic frequency and phase control (AFPC) generates sinusoidal oscillations at the second harmonic of color subcarrier frequency as a primary clocking signal. A zero-crossing detector 71 detects average axis crossings of the sinusoidal oscillations to generate pulses at a rate four times color subcarrier frequency. These pulses time the sampling of the composite video signal for digitization by the ADC 50; and they would time the advance of data in the temporary line store 60 if it were a serial memory. In the FIG. 2 ghost-suppression circuitry the temporary line store 60 is a random-access memory arranged for read-then-write operation as each of its storage locations is addressed. The addresses of its storage locations are recurrently scanned in accordance with the count of pixels supplied from a ten-stage digital counter 72 denominated as "pixel counter", which counts the pulses from the zero-crossing detector 71. These same addresses are supplied to the filter-coefficient computer 55 to be used to address a line storage register therein when separated GCR signal is transfered thereto from the temporary line store 60.

Generally, if it exists, the color burst signal is the most stable frequency reference in a composite video signal and is the preferred reference signal for AFPC of the oscillator 70. The overflow signal from the second stage of the pixel counter 72 is presumably a 3.58 MHz square wave and is supplied as a feedback signal to a first AFPC detector 73 for comparison to a separated burst signal, in order to generate an error signal an AFPC signal multiplexer 74 selectively applies to the pixel counter 72 for controlling the frequency and phase of its oscillations. A burst gate 75 responds to pulses from a burst gate control signal generator 76 to separate from the analog composite video signal supplied from the TV receiver front end 20 a color burst signal to be supplied to the first AFPC detector 73. The horizontal sync pulses from the television receiver front end 20 are supplied to the burst gate control signal generator 76 and their trailing edges are used to time the pulses that the generator 76 generates during color burst intervals. A cascade of astable flip-flops or "one-shots" are customarily employed in the generation of these pulses.

The decoder circuitry 68 responds to the scan line counts that the line counter 56 provides which correspond to the VBI lines in each field to generate an inhibitory signal. This inhibitory signal is applied to the burst gate control signal generator 76 to inhibit its generating pulses, so that the burst gate 75 will select only those backporch intervals during a field which can have color burst. (In a variant embodiment the burst gate control signal generator 76 is not inhibited from generating burst gate pulses during the vertical blanking interval and the time constant of the first AFPC detector is made longer than necessary in the FIG. 2 circuitry.)

An amplitude detector 77 denominated the "color burst presence detector" detects when burst is present in the output signal from the burst gate 75 to supply a ONE that conditions the AFPC signal multiplexer 74 to select the output signal from the first AFPC detector 73 as a first error signal, for application to the controlled oscillator 70 as its AFPC signal. Preferably, from the standpoint of immunity to noise, the amplitude detector 77 comprises a synchronous detector stage followed by a threshold detector stage followed by a short-pulse eliminator. Arrangements of the pixel counter 72 can be made for providing a pair of 3.58 MHz square waves in quadrature phase relationship with each other for application to the synchronous detection portions of the detectors 73 and 77. Arrangements of counters to provide square waves in quadrature phase relationship with each other are familiar to television circuit designers, being commonly used in television stereophonic sound decoders. Short-pulse eliminators are known from radar and are commonly constructed using circuitry for ANDing differentially delayed input signal thereto thereby to generate output signal therefrom.

When a television signal is received without attendant color burst, as in a black-and-white television signal, the reference signal for AFPC of the oscillator 70 will have to be the separated horizontal sync pulses supplied to the AFPC circuitry from the TV receiver front end 20. The color burst presence detector 77 will supply a ZERO when the composite video signal supplied from the TV receiver front end 20 has no attendant color burst, conditioning the AFPC signal multiplexer 74 to select the output signal from a second AFPC detector 78 to controlled oscillator 70 as its AFPC signal. A sync decoder 79 responds with a ONE to the count(s) of the pixel counter 72 theoretically corresponding to the occurrence of the horizontal sync pulse or a prescribed portion thereof, such as an edge thereof. The output signal from the sync decoder 79 is supplied as feedback signal to the second AFPC detector 78, which compares that feedback pulse to an input reference signal taken from the horizontal sync pulses supplied from the horizontal sync separator in the TV receiver front end 20 and generates a second error signal for being selectively applied by the AFPC signal multiplexer 74 to controlled oscillator 70 as its AFPC signal. This AFPC arrangement is called "line-locked-clock" by television engineers.

Stability of the oscillations of the controlled oscillator 70 is required over the number of fields from which the $19^{th}$ scan lines are taken for accumulation in the temporary line store 60, in order that the accumulation procedure by which the Bessel chirp is separated from those lines adequately suppresses horizontal sync pulse, front porch, back porch including color burst and +30 IRE pedestal. Crystal control of the frequency of the oscillations is a practical necessity; and the automatic phase control (APC) aspect of the AFPC should predominate, with the automatic frequency control (APC) aspect of the AFPC having a very long time constant—i.e., several fields long.

The circuits for resetting the counters 56, 57 and 72 are omitted from FIG. 2 to avoid undue complexity. The scan line counter 56 can be simply reset by the leading edges of vertical sync pulses supplied from the vertical sync separator in the TV receiver front end 20.

The pixel count from the pixel counter 72 is reset when necessary in order to re-synchronize it with the scan lines in the composite video signal supplied from the video detector of the TV receiver front end 20. The leading and trailing edges of the horizontal sync pulses supplied from the horizontal sync separator of the TV receiver front end 20 are detected, using a differentiator followed by a appropriate level comparators. The leading edge detector result is used to command the loading of a temporary storage register with the current pixel count. The pixel count is applied to a window comparator to determine if it is within its expected range and to generate an indication of error if it is not. The count of the pixel counter 72 is conditionally reset to zero responsive to the trailing edge detector result. The condition for reset may be a single indication of pixel count error. However, better noise immunity is obtained by counting the errors in an up/down counter configured so a given number of consecutive errors must be counted before pixel count is corrected.

FIG. 3 shows circuitry for resetting the modulo-eight field counter 57 so its count either is correctly phased or is misphased by four fields. The temporary line store 31 is shown as being a random-access memory addressed by the pixel count supplied from the pixel counter 72. The line store 31 is arranged for read-then-write operation. The logic ONE issued by the decoder 58 only during the $19^{th}$ scan line of each field is furnished to a multiplexer 310 to condition the updating of the temporary line store 31 with digitized $19^{th}$ scan line samples supplied from the ADC 50. During other scan lines the logic ZERO issued by the decoder 58 conditions the multiplexer 310 to apply the data read from the temporary line store 31 for writing back thereinto.

The temporary line store 31 is provided with pixel latches 32 and 33 clocked by the output signal from the zero-crossing detector 71. The pixel latches 32 and 33 are used for temporarily storing the last pixel written into the temporary line store 31 and the last pixel read out of the temporary line store 31, respectively, aligning those samples in time to be respective ones of the subtrahend and minuend input signals of a digital subtractor 34. The pixel samples of the difference signal from the subtractor 34 will all be zero valued except during $19^{th}$ scan lines. The difference signal from the subtractor 34 is furnished to an absolute-value circuit 35, which can comprise a battery of two-input exclusive-OR gates each receiving the sign bit of the difference signal as a first input and receiving a respective other bit of the difference signal for selectively complementing, and which can then further comprise a digital adder for adding the sign bit of the difference signal to the selectively complemented remaining bits of the difference signal to generate as a sum output signal the absolute value of the difference signal.

An accumulator 36 for successive samples of the absolute-value circuit 35 output signal includes an output latch 361 for temporarily storing successive values of the accumulation result, a digital adder 362 for adding the successive samples of the output signal of the absolute-value circuit 35 to the accumulation result to augment its value, and a multiplexer 363 for selectively supplying the augmented accumulation result to the output latch 361 for updating its contents. The multiplexer 363 is wired for inserting arithmetic zero into the output latch 361 whenever the decoder 58 does not detect the counter 56 supplying a scan line count of nineteen. A decoder 364 responds to the pixel count from the counter 72 being descriptive of those portions of a scan line as may contain Bessel chirp information to furnish a ONE, which is ANDed with the output signal from the zero-crossing detector 71 in an AND gate 365. The output latch 361 is clocked to receive input data responsive only to a ONE being received from the AND gate 365.

The successive samples of the absolute value of the difference of the nineteen lines of the current and previous fields, as supplied serially from the absolute-value circuit 35, are accumulated using the accumulator 36. The accumulation result should have appreciable value if the current field is not FIELD 001 or FIELD 101. The $19^{th}$ lines of FIELD 000 and of FIELD 001 both contain ETP signal, so their difference is zero-valued except for noise. The $19^{th}$ lines of FIELD 100 and of FIELD 101 both contain ETR signal, so their difference is zero-valued except for noise. The output signal of a threshold detector 37, which is a ONE when the accumulation result is substantially more than arithmetic zero and is otherwise a ZERO, is complemented by a NOT gate 38 to supply one of the four input signals of an AND gate 39. A decoder 41 detects the field count from the counter 57 being other than 001 or 101 to furnish a ONE to the AND gate, which ONE is indicative that the field count is misphased and enables the resetting of the counter 57. The output signal of the decoder 58, which detects the occurrence of the $19^{th}$ line of a field, and the output signal of a decoder 42, which responds to the pixel count from the counter 72 to detect the end of a scan line, are the other two input signals to the AND gate 39. Providing that the field count is not 001 or 101, the AND gate 39 generates a ONE to reset the counter 57 to 001 field count at the end of the $19^{th}$ line of a FIELD 000 or of a FIELD 100 in the television signal received by the TV receiver front end 20. Alternatively, the counter 57 could be reset to 101; or provision can be made for resetting only the two least significant bits of the field count, resetting them to 01.

Returning to FIG. 3, if the modulo-eight field count provided by the field counter 57 is correctly phased, the accumulation result attained in the temporary line store 60 during FIELD 000, the last field in the cycle of accumulation, will be eight times the ETP Bessel chirp signal devoid of accompanying horizontal sync pulse, front porch, back porch including color burst and +30 IRE pedestal. On the other hand, if the modulo-eight field count provided by the field counter 57 is misphased by four fields, the accumulation result attained in the temporary line store 60 during FIELD 000, the last field in the cycle of accumulation will be eight times the ETR Bessel chirp signal devoid of accompanying horizontal sync pulse, front porch, back porch including color burst and +30 IRE pedestal. A wired three binary place shift in the direction towards reduced magnitude divides the accumulation results attained in the temporary line store 60 during FIELD 000 by eight, and the resulting quotients are supplied as the ETP or ETR signal to the filter-coefficient computer 55.

The filter-coefficient computer 55, which is well-adapted to performing correlations against a ghost-free Bessel chirp function ETP or ETR stored in an internal register thereof, is programmed to perform a correlation substep that determines whether the input it receives from the temporary line store 60 during FIELD 000 is ETP signal, is ETR signal, or is unrelated to the ETP or ETR signal. This procedure enables the filter-coefficient computer 55 to determine when no GCR signals are included in the television signal received by the TV receiver front end 20. The computer 55 may then apply predetermined "bypass mode" weighting coefficients as stored in registers therewithin to the filters 51, 52 and 53. Alternatively, the computer 55 may be arranged to compute weighting coefficients for the filters 51, 52 and 53 proceeding from data concerning received ghosts supplied by means that do not rely on GCR signals being included in the television signal received by the TV receiver front end 20.

In other variations of the FIG. 3 circuitry, circuitry external to the computer 55 is provided for analyzing the GCR signal stored in the temporary line store 31 (during the scan line following its acquisition, for example) to determine whether it is an ETP or ETR signal and this determination is used to determine whether the most significant bit of the reset condition for the field counter 57 is a ZERO so reset is to 001 field count or is a ONE so reset is to 101 field count. The contents of the temporary line store 31 are scanned in accordance with the pixel count from the counter 72 during the analysis procedure.

In an exemplary analysis procedure, the portions of the pixel count corresponding to the initial lobe of the Bessel chirp are decoded to selectively generate a ONE that is used to enable accumulation by either of two accumulators. One accumulator further requires that the sign bit of the current GCR signal be ZERO in order to accumulate its magnitude (absolute-value) in excess of a threshold value T. The other accumulator further requires that the sign bit of the current GCR signal be ONE in order to accumulate its magnitude (absolute-value) in excess of a threshold value T. After the portion of the pixel count corresponding to the initial lobe of the Bessel chirp is scanned, the magnitudes of the accumulator contents are each compared in respective comparators to a threshold value T that is almost as large as the integral of the absolute value of the initial lobe of the Bessel chirp. If the contents of the accumulator that requires that the sign bit of the current GCR signal be ZERO in order to accumulate exceeds this threshold T after the initial lobe of the Bessel chirp, the comparator associated with that accumulator furnishes a ONE to the filter-coefficient computer 55, which ONE together with a ZERO from the other comparator identifies the presence of an ETP signal. Conversely, if the contents of the accumulator that requires that the sign bit of the current GCR signal be ONE in order to accumulate exceeds this threshold T after the initial lobe of the Bessel chirp, the associated comparator furnishes a ONE to the computer 55, which ONE together with a ZERO from the other comparator identifies the presence of an an ETR signal. If this threshold T is not exceeded by the contents of either of these accumulators after the initial lobe of the Bessel chirp, the two associated comparators both furnish ZEROs to the computer 55, which determines that neither an ETP or an ETR signal exists in the television signal which the FIG. 2 apparatus is attempting to deghost. In further refinements of this scheme, the threshold value T is adjusted responsive to noise and GCR signal amplitude conditions.

Variations of the FIG. 2 ghost-suppression circuitry are possible wherein, when data is being transferred from the temporary line store 60 to a line storage register in the filter-coefficient computer 55, the addressing of the temporary line store 60 and of the line storage register being transfered to is generated within the computer 55, instead of by the pixel counter 72. A multiplexer under control of decoder 58 or of the computer 55 can apply addresses to the temporary line store 60, selecting them from the pixel counter 72 during the $19^{th}$ line of each field and otherwise selecting them from those provided by the computer 55. Variations of the FIG. 2 ghost-suppression circuitry are also possible wherein a plurality of temporary line stores are used, instead of a single temporary line store 60, enabling the computer 55 to update the coefficients of the filters 51, 52 and 53 more often than on an eight-field cycle.

Another modification that can be made to the FIG. 2 ghost-suppression circuitry is the accumulation in the temporary line store 60 of the $19^{th}$ scan lines from sixteen consecutive fields, rather than eight. This further correlates the separated Bessel chirp information, which significantly improves its signal-to-noise ratio as supplied to the filter-coefficient computer 55. In such variations of the FIG. 2 ghost-suppression circuitry the modulo-8 field counter 57 is replaced by a modulo-16 field counter and the decoder 65 is replaced by a decoder that generates a ONE when and only when FIELD COUNT from that modulo-16 field counter is 0000. The temporary 1-line store 60 will then accumulate GCR signals from sixteen consecutive fields, which can be divided by sixteen using a wired 4-binary-place shift to supply the computer 55 an updated reduced-noise GCR signal with attendant ghosts. Further accumulation—e.g., of the $19^{th}$ scan lines from 24 consecutive fields—provides little more improvement in the signal-to-noise ratio of the separated Bessel chirp information supplied to the filter-coefficient computer 55.

In further or still other variations of the FIG. 2 ghost-suppression circuitry the temporary single-scan-line store 60 is replaced by a temporary two-scan-line store and the decoder 58 is replaced by a decoder for detecting the presence of the $18^{th}$ or $19^{th}$ scan lines to supply ONEs for two consecutive scan lines to condition the multiplexer 59 for loading the temporary two-scan-line store. The decoder 64 is replaced by a decoder for detecting the presence of the $261^{st}$ or $262^{nd}$ scan lines to supply ONEs for two consecutive scan lines to the AND gate 63. The AND gate 63 responds to the ONEs during the $261^{st}$ or $262^{nd}$ scan lines of each field identified by a FIELD COUNT with all bits ZEROs to condition the multiplexer 62 to empty the contents from the temporary two-scan-line store. Or the temporary single-scan-line store 60 may be replaced by a temporary three-scan-line store and the decoder 58 may be replaced by a decoder for detecting the presence of the $18^{th}$ through $20^{th}$ scan lines to condition the multiplexer 59 for loading the temporary three-scan-line store, with suitable provisions for periodically erasing the 3-line store. These arrangements facilitate the pairwise combination of VBI intervals containing antiphase GCR signals and in-phase other reference signals, in order to suppress longer-delayed macroghosts.

From the standpoint of simplifying hardware, the decoder 64 of FIG. 2 is preferably replaced by any one of several simpler decoders each of which provides a ONE for one line or a pair of lines after the $19^{th}$ line, but before the $262^{nd}$ line. For example, a decoder that detects a ONE in the eighth least significant bit of LINE COUNT may be used together with the decoder 65 to supply the two input signals of the AND gate 63. The AND gate 63 will then condition the multiplexer 62 to empty the contents of the temporary line store 60 on each of the scan lines after the $255^{th}$ in the field identified by the FIELD COUNT that is zero in every binary place.

FIG. 4 shows the flow diagram of one method for establishing the operating parameters of the filters 51, 52 and 53, which procedure is carried out by the filter-coefficient computer 55. This method uses successive-approximation techniques to correct for interaction between the responses of the filters 51 and 52 when both leading and trailing macroghosts accompany the predominant image. Entry to the START condition 81 of the FIG. 4 procedure is at the time power is turned on in the television receiver, when a new channel is tuned, or when a prescribed time has elapsed since the last deghosting procedure. A RESET ALL DEGHOST FILTERS step 82 preferably sets the filter coefficients in the filters 51, 52 and 53 to values previously determined for the channel to which the TV receiver front end 20 is tuned and stored in a channel-addressed memory. Alternatively, during power-up or retuning, the filter coefficients in the filters 51, 52 and 53 can be set to "bypass mode" values associated with a ghost-free signal; and during periodic deghosting previous values of the filter coefficients are retained during "reset".

An ACQUIRE DATA step 83 then follows, which step 83 is completed after the number of fields elapse that the computer 55 must wait for accumulation in the temporary line store 60 to be completed, in order to generate a separated GCR signal that is suitable input data for the computer 55. The ACQUIRE DATA step 83 includes a correlation substep not shown in FIG. 4 which substep determines whether the input the computer 55 receives from the temporary line store 60 during FIELD 000 is ETP signal, is ETR signal, or is unrelated to the ETP or ETR signal.

A CHANNEL CHARACTERIZATION step 84 then takes place. The computer 55 carries this out by correlating, in the time domain, the ghost-free GCR signal stored in its permanent memory with the ghosted GCR signal separated from the received composite video signal. The location in time of the predominant response in the data supplied the computer 55 is detected, then the respective location in time of each successively smaller one of the significantly large ghost responses, up to the number of post-ghosts that can be suppressed by the filter 51 and up to the number of pre-ghosts that can be suppressed by the filter 52. The respective locations in time of the predominant response and multipath responses in the data supplied the computer 55 are calculated and stored temporarily in the internal memory of the computer 55, to be used as the basis for programming the bulk delay lines interspersed between the clumps of taps in the IIR filter 51. The relative strengths of the predominant response and multipath responses in the data supplied to the computer 55 are calculated by the computer 55 and stored temporarily in its internal memory, to be used as the basis for assigning weights to the clumped taps of IIR filter 51 and to the taps of FIR filter 52.

FIG. 7 shows a set of substeps that the filter coefficients computer 55 can be programmed to do in order to perform the CHANNEL CHARACTERIZATION step 84. Just after a START STEP condition 840, in an initial substep 841, the discrete Fourier transform (DFT) of the acquired GCR signal is calculated. Then, in a substep 842 the computer 55 divides the terms of that DFT by the corresponding terms of the DFT of a ghost-free GCR signal, which latter DFT is known a priori and is stored in the internal memory of the computer 55. This term-by-term division procedure of the substep 842 generates the DFT of the reception channel, which is temporarily stored in the internal memory of the computer 55.

As part of the CHANNEL CHARACTERIZATION step 84, it is preferable to normalize the terms of the DFT of the reception channel respective to the energy in the predominant image. In a substep 843 the computer 55 responds to its programming to sort out the largest-magnitude term of the DFT of the reception channel. Then, in a subsequent substep 844 the r-m-s energy of that term and its closeby surrounding terms (e.g., twelve on each side) is determined and temporarily stored in the internal memory of the computer 55. Normalization could be done on the predominate image and all ghost images, but it is preferably from the standpoint of reducing calculations to perform normalization only on those terms descriptive of "strong" ghosts, or ghosts with appreciable energy, and to replace the other terms with zeroes.

The determination of terms descriptive of strong ghosts in a substep 845 is done as follows. The r-m-s energy of the largest-magnitude term of the DFT of the reception channel and its closeby terms, which terms describe the predominant image, is scaled down to provide a threshold level against which to compare the other terms of the DFT of the reception channel. A threshold level $-30$ dB down from the r-m-s energy of the predominant image has been found satisfactory. Each of the terms of the DFT of the reception channel that exceeds that threshold level is considered to be descriptive of a strong ghost image and is compared to its neighboring terms to determine the largest local term and locate in time the center of the strong ghost. The largest local term and its closeby terms, as are descriptive of the strong ghost image, are tagged in the internal memory of the computer 55. The storage of the terms of a DFT in the computer 55 can be done in respective storage locations as addressed by time bin, and tagging is then done by setting to prescribed value a tag bit associated with the bits describing the magnitude of the term.

Then, in a substep 846 that discards weak ghost images in the reception channel DFT to generate an approximated DFT of the reception channel, the computer 55 changes to zeroes the values of all the non-tagged terms of the reception channel DFT temporarily stored in its internal memory.

In a normalization substep 847, the computer 55 divides each of the tagged terms in the approximated DFT by the r-m-s energy of the predominant image, to generate a normalized approximated DFT of the reception channel. This normalized approximated DFT of the reception channel is temporarily stored in the internal memory of the computer 55, to be used to support the remaining portions of the calculations, before a STEP DONE condition 848 is finally reached in the step 84. The tags are retained on the terms of the normalized approximated DFT of the reception channel temporarily stored in the internal memory of the computer 55, so the tags can be used for implementing a later decision step 88 in the FIG. 4 procedure.

A STABLE GHOST? decision step 85 follows the CHANNEL CHARACTERIZATION step 84. This step is carried forward in the computer 55 using a subroutine where the results of the CHANNEL CHARACTERIZATION step 84 just previous to the most recent CHANNEL CHARACTERIZATION step 84 are fetched from a register in the internal memory of the computer 55 and are replaced in that register by the results of the current CHANNEL CHARACTERIZATION step 84. The computer 55 cross-correlates the results of the most recent CHANNEL CHARACTERIZATION step 84 with the results of the just-previous CHANNEL CHARACTERIZATION step 84 to determine whether the correlation is sufficiently good that the ghosting conditions can be considered stable, or unchanging. Only if the ghosting conditions are substantially unchanging is a Y(ES) signal generated indicating there a basis for going on further with the deghosting procedure using the most recent CHANNEL CHARACTERIZATION results. If the A STABLE GHOST? decision step 85 generates an N(O) signal indicative of changing ghost conditions, operation in the computer 55 loops back to the ACQUIRE DATA step 83, and the adjustable filtering parameters of the IIR filter 51 and of the FIR filter 52 are left unchanged. If the STABLE GHOST? decision step 85 generates a Y(ES) signal, the procedure goes on to steps 86–88, which use the most recent CHANNEL CHARACTERIZATION step 84 results as the basis for updating the adjustable filtering parameters of the IIR filter 51 and of the FIR filter 52.

In the UPDATE IIR COEFFICIENTS step 86 the programmable delays and the non-zero weighting coeffients of the IIR filter 51 are updated by the computer 55, using the most recent CHANNEL CHARACTER- IZATION step 84 results as the basis for the updating. More particularly, the post-ghost portion of the most recent normalized approximated reception channel DFT, those tagged terms later in time than the largest-magnitude term, are complemented to generate the DFT of the desired IIR filter 51 response, from which DFT the updated IIR filter coefficients are taken. The non-zero terms of the DFT of the desired IIR filter 51 response are used to determine weighting coefficients. If the IIR filter 51 is of a sparse coefficient type, the computer 55 operates to measure the lengths of intervals containing just untagged zero coefficients, to determine the values of delay for the ajustable bulk delay devices. The computer 55 applies the updated IIR filter parameters to the IIR filter 51.

An UPDATE FIR COEFFICIENTS step 87 is performed by the computer 55 after it performs the UPDATE IIR COEFFICIENTS step 86. The non-zero weighting coefficients of the FIR filter 52 are updated by the computer 55, using the most recent CHANNEL CHARACTERIZATION step 84 results as the basis for the updating. More particularly, the pre-ghost portion of the most recent normalized reception channel DFT results, those earlier in time than the largest-magnitude term, are complemented to generate the DFT of the desired FIR filter 52 response, from which DFT the updated FIR filter coefficients are taken. If the FIR filter 52 is of a sparse coefficient type, the computer 55 operates to measure the lengths of intervals containing all zero coefficients, to determine the adjustable delay of bulk delay devices. The computer 55 applies the updated FIR filter coefficients to the FIR filter 52.

FIG. 4 shows a decision step 88 of GHOSTS BELOW THRESHOLD? being reached by the computer 55 after the UPDATE IIR COEFFICIENTS and UPDATE FIR COEFFICIENTS steps 86 and 87 are performed. The step 88 may be implemented proceeding from a count of the number of tags attached to terms of the normalized approximated reception channel DFT in the CHANNEL CHARACTERIZATION step 84, the count being fifteen or below (i.e., the count not being appreciably higher than the number of tags associated with the predominate image) generating a Y(ES) signal, and the count being sixteen or above generating a N(O) signal. Alternatively, the step 88 may be implemented proceeding from a count of the number of untagged terms, inasmuch as the number of tagged terms and the number of untagged terms sum to a prescribed total number of terms.

An N(O) signal resulting from the GHOSTS BELOW THRESHOLD? step 88 directs the operation of the computer 55 to a MAXIMUM NUMBER OF ITERATIONS STEP 89. An iterations counter in the computer 55 counts the number of consecutive N(O) signals resulting from the GHOSTS BELOW THRESHOLD? decision step 88 and is reset to zero count by a Y(ES) signal resulting from the GHOSTS BELOW THRESHOLD? step 88. An N(O) signal resulting from the GHOSTS BELOW THRESHOLD? step 88 before maximum count is reached by this iterations counter loops operation back to the ACQUIRE DATA step 83.

If the decision in step 88 is Y(ES), all significant ghosts have been canceled, or, if the decision in step 89 is Y(ES), indicating that sufficient iterations have been made that there is assurance that the filters 51 and 52 do not have the capability to be further adjusted to cancel at least one more ghost, the part of the procedure having to do with cancelling macroghosts is completed in the computer 55, and the computer 55 proceeds on to an UPDATE EQUALIZATION COEFFICIENTS step 90 in which weighting coefficients for the amplitude-equalization filter 53 are calculated. The iterations counter is either reset to zero count by a Y(ES) signal resulting from one of the decision steps 88 and 89, or rolls over to zero count.

FIG. 8 shows a subroutine that the computer 55 can use for performing the UPDATE EQUALIZATION COEFFICIENTS step 90. Proceeding from a START STEP 900 condition, the computer 55 in a substep 901 responds to its programming to compute, from the response of the macroghost cancelation filter comprising the cascade connection of the filters 51 and 52, the DFT of just the Bessel chirp portion of the ghosted GCR signal as separated from the rest of that signal by a windowing procedure. This DFT has non-zero terms only closeby its largest-magnitude term and in a substep 902 is divided term by term into the DFT of the ideal response to a ghost-free windowed Bessel chirp, as drawn from the permanent memory of the computer 55. This generates the DFT of the equalization filter 53, which is the basis for the computer 55 calculating in a substep 903 updated tap weights of the FIR filter 53, used to counter the effects of microghosts. The bin width of the DFT terms can be the same as the bin width of the DFT terms involved in the calculations of the adjustable filtering parameters of the filters 51 and 52 used to suppress macroghosts. The number of taps for the FIR filter 53 is typically no more than thirty-one, however, so the number of spectral bins in the truncated DFT is reasonably small and the time required to do these calculations is not unreasonably lengthy. The division procedures in these methods of performing equalization are prone to error when the GCR signal is noisy or when division is by small numbers, so there is some need for limiting the upward range of quotients. In a final substep 904, just before a STEP DONE condition 905 is reached, the updated weighting coefficients calculated by the computer 55 in substep 903 are applied to the coefficient registers of the FIR filter 53.

Following the computer 55 performing the UPDATE EQUALIZATION COEFFICIENTS step 90, another ACQUIRE DATA step 91 follows in the FIG. 4 procedure. Step 91 is completed after the number of fields elapse that the computer 55 must wait for accumulation in the temporary line store 60 to be completed, in order to generate a separated GCR signal that is suitable input data for the computer 55. The ACQUIRE DATA step 91 includes a correlation substep not shown in FIG. 4 in which substep the computer 55 determines whether the input it receives from the temporary line store 60 during FIELD 000 is ETP signal, is ETR signal, or is unrelated to the ETP or ETR signal.

Another CHANNEL CHARACTERIZATION step 92 is then performed by the computer 55, using any ETP or ETR signal acquired in the step 91 to recalculate the DFT of the reception channel. In a GHOSTS SAME? decision step 93 the computer 55 determines whether the DFT of the reception channel recalculated in the CHANNEL CHARACTERIZATION step 92 correlates with the DFT of the reception channel as previously calculated in the CHANNEL CHARACTERIZATION step 84. From the standpoint of easy implementation, the correlation is preferably done in an indirect manner by checking to see if the residual ghosts in both the CHANNEL CHARACTERIZATION step 84 and the CHANNEL CHARACTERIZATION step 93 are all below prescribed threshold level. If the correlation is good, indicating that ghosting has not changed appreciably, the decision step 93 generates a Y(ES) signal that loops operation back to the ACQUIRE DATA step 91, to continue checking to find out whether or not ghosting has changed appreciably. The filtering parameters of the filters 51-53 are left unchanged by the computer 55.

If the correlation is poor, indicating that ghosting has changed, the decision step 93 generates a N(O) signal that loops computer 55 operation back to the RESET ALL DEGHOST FILTERS step 82. This procedure disables ghost suppression when rapidly changing multipath conditions occur or when a different reception channel is selected. The filtering parameters of the filters 51-53 are then subject to recalculation by the computer 55, following the steps already described.

In the FIG. 4 procedure the computer 55 performs the UPDATE IIR COEFFICIENTS step 86 and the UPDATE FIR COEFFICIENTS step 87 independently of each other during each passage through these two successive steps. The updating of the filter coefficients of the initial one of the cascaded ghost cancelation filters, here the post-ghost filter 51, gives rise to "filter-generated" ghosts of the type that could be suppressed by updating of the filter coefficients of the final one of these filters, here the pre-ghost filter 52. Since the UPDATE IIR COEFFICIENTS step 86 and the UPDATE FIR COEFFICIENTS step 87 do not take these "filter-generated" ghosts into account, the subsequent recalculation of the weighting coefficients of the cascaded ghost-cancelation filters 51 and 52 during the next passage through these two successive steps will introduce compensatory ghosts that will reduce the "filter-generated" ghosts in the final filter response. Since this reduction may not be complete, recalculation of the weighting coefficients of the final one of the cascaded ghost cancelation filters should be provided for. The loop around steps 83-89 implements these recalculations by the computer 55.

FIG. 5 shows the flow diagram of an alternative method for establishing the operating parameters of the filters 51, 52 and 53, which procedure is carried out by the filter-coefficient computer 55. This method is similar to the FIG. 4 method, but dispenses with the UPDATE EQUALIZATION COEFFICIENTS STEP 90 after the GHOST BELOW THRESHOLD? decision step 88 in favor of an UPDATE EQUALIZATION COEFFICIENTS STEP 94 before the decision step 88. The UPDATE EQUALIZATION COEFFICIENTS STEP 94 is included in the iteration loop in order that the adjustment of the weighting coefficients of the equalization filter may be effected slowly, over many steps of acquiring GCR signal data. This reduces the sensitivity of the weighting coefficients of the equalization filter to noise accompanying the GCR signal. The GCR signal is coherent over many steps of acquiring GCR signal data, to consistently adjust the weighting coefficients of the equalization filter towards desired values. The noise accompanying the GCR signal is incoherent—i.e. random over many steps of acquiring GCR signal data—so its effect on the values of the weighting coefficients of the equalization filter averages to zero on a least-means-squares-error basis.

FIG. 12 shows the subroutine used by the computer 55 in performing the UPDATE EQUALIZATION COEFFICIENTS step 94. The filter 53 weighting coefficients are adjusted by the computer 55 in the step 94 so that the response of the cascade connection of filters 51-53 accumulated in the temporary line store 60 best fits an ideal response to a ghost-free GCR Bessel chirp, as stored in the memory of the computer 55. Responding to a START STEP condition 904, the computer 55 in a substep 941 responds to its programming to compute, from the response of the macroghost cancelation filter comprising the cascade connection of the filters 51 and 52, the DFT of just the Bessel chirp portion of the ghosted GCR signal as separated from the rest of that signal by a windowing procedure, after which initial substep 941 the subroutine progresses to a substep 942. In the substep 905, the computer 55 responds to its programming to generate the cross-correlation of the DFT of just the Bessel chirp portion of the ghosted GCR signal to the DFT of the ideal response to a ghost-free windowed Bessel chirp, as drawn from the permanent memory of the computer 55. To generate the cross-correlation result the computer 55 considers the terms of one of the DFTs in reversed-time sequence and successively uses them to multiply the terms of the other DFT. (Refer to pages 69-71 and 471 of DIGITAL SIGNAL PROCESSING IN VLSI by Richard J. Higgins, Prentice Hall, Englewood Cliffs, N.J.) The cross-correlation is carried out on a circular basis, with the DFTs each wrapping around on itself in the time domain. The result of this correlation procedure determines the timing reference to which the central tap of the equalization filter 53 will be referred and respective to which the relative delays afforded at the other taps of the filter 53 will be referred.

In a subsequent substep 943, The computer 55 calculates the changes in the "middle" terms of the cross-correlation response required to bring them into correspondence with the result of cross-correlating an infinite-bandwidth windowed ghost-free Bessel chirp with the ideal response to a windowed ghost-free Bessel chirp. The ideal response to a windowed ghost-free Bessel chirp used in this and the FIG. 8 subroutine could have a (sin x)/x envelope in the time domain, descriptive of a low-pass step response in the frequency domain. However, usually a subjectively more pleasing video image is one which has some high-frequency peaking to improve transient response; so the ideal response to a ghost-free GCR Bessel chirp stored in the memory of the computer 55 for use in equalization may preferably be one having appropriate high-frequency peaking.

In a subsequent substep 944 leading to the STEP DONE condition 945, the computer 55 increments (or decrements) each of the weights in the equalization filter by a fraction of the change required to bring it into correspondence with the result of cross-correlating an infinite-bandwidth windowed ghost-free Bessel chirp with the ideal response to a windowed ghost-free Bessel chirp. This procedure, together with the iteration loop around steps 88, 89, 83-87 and 94 in the procedure carried out by the computer 55, slowly adjusts the weighting coefficients of the equalization filter 53. This makes it less likely that impulse noise accompanying the GCR signal will lead to erroneous calculation of the equalization filter 53 weighting coefficients.

FIG. 6 shows the flow diagram of another alternative method the filter-coefficient computer 55 can use for establishing the operating parameters of the filters 51, 52 and 53. In the FIG. 6 method the computer 55 calculates, without need for successive approximation, the corrections for the interaction between the responses of the filters 51 and 52 when both leading and trailing macroghosts accompany the predominant image. Entry to the START condition 81 of the FIG. 6 procedure is the same as for the FIG. 4 procedure; and the RESET ALL DEGHOST FILTERS step 82, the ACQUIRE DATA step 83, the CHANNEL CHARACTERIZATION step 84, the STABLE GHOST? decision step 85, and the loop back from step 85 to step 83 are the same in both the FIG. 4 and FIG. 6 procedures.

When a Y(ES) output signal is generated by the STABLE GHOST? decision step 85, the FIG. 6 procedure progresses to a CALCULATE IIR COEFFICIENTS step 96 and a CALCULATE FIR COEFFICIENTS step 97. The calculations of the adjustable filtering parameters for the filters 51 and 52 carried out by the computer 55 in the steps 96 and 97 of the FIG. 6 procedure, which steps can be performed in any order, correspond to the calculations carried out in the UPDATE IIR COEFFICIENTS step 86 and the UPDATE FIR COEFFICIENTS step 87 of the FIG. 4 procedure. However, in the FIG. 6 procedure the computer 55 defers application of the adjustable filtering parameters to the filters 51 and 52 until after it completes making corrections to these filtering parameters. A CALCULATE CORRECTIONS FOR "FILTER-GENERATED" GHOSTS step 98, which will be described in greater detail further on, follows steps 96 and 97 of the FIG. 6 procedure, in which step 98 the computer 55 generates adjustments to be made to the filtering parameters of the filters 51 and 52 as previously calculated in the steps 86 and 87. Then, in an UPDATE ALL DEGHOST FILTERS step 99 the computer 55 applies the adjusted filtering parameters to the filters 51 and 52. In the FIG. 6 procedure the computer 55 then continues to the UPDATE EQUALIZATION COEFFICIENTS step 90. This continuation is invariably made, there never being any need for the computer 55 to loop its operation back to the ACQUIRE DATA step 83 as it does in the FIG. 4 procedure.

The UPDATE EQUALIZATION COEFFICIENTS step 90, the ACQUIRE DATA step 91, the FURTHER CHANNEL CHARACTERIZATION step 92, the GHOSTS SAME? decision step 93, the loop back from step 93 to step 91 and the loop back from step 93 to step 82 are the same in both the FIG. 4 and FIG. 6 procedures.

In the FIG. 4 and FIG. 6 procedures, the equalization filter 53 corrects for microghosts generated during the correction of macroghosts, in addition to providing corrections for received microghosts accompanying the composite video signal supplied from the video detector, as described above. These microghosts occur because the cancellation of macroghosts is not carried out on the video signal considered as a complex signal, but is (in accordance with the foregoing description) only carried out on the video signal considered as a real signal, and because the number of taps in each clumped-tap segment of a sparsely tapped ghost-cancelation filter is limited to only ten or so. The use of the equalization filter 53 to correct for microghosts generated during the cancelation of macroghosts is a concept having application to configurations where the cancelation of macroghosts is carried out in filter arrangements other than the cascade connection of an IIR filter 51 and an FIR filter 52, the inventors observe.

The FIG. 6 method described above can be adapted for use where the suppression of macroghost in composite video signals supplied from the video detector of a TV receiver or video tape recorder is carried out using just an IIR filter. In such adaptation the step 99 follows directly after the step 96, and the steps 97 and 98 are omitted. There will be no capability for suppressing pre-ghosts, but pre-ghosting conditions that serious compared to post-ghosting conditions are relatively rare, usually occurring in crowded urban environments during off-the-air reception using an omni-directional antenna or a mis-oriented directional antenna.

The FIG. 6 method described above can also be adapted for use where the suppression of macroghosts in composite video signals supplied from the video detector of a TV receiver or video tape recorder is carried out using just an FIR filter. In such adaption the step 96 is omitted, the step 99 follows directly after the step 97, and the step 98 is omitted. The suppression of macroghosts using just an FIR filter avoids the problem of ghost cancelation continuing ad infintum at constantly reduced levels, which can sometimes cause faintly visible de-ghosting artifacts. Group delay problems inherent in IIR filter designs can be avoided.

FIG. 9 shows one form in which the sparsely weighted IIR filter 51 can be implemented. In this FIG. 9 form, the IIR filter 51 is an output-weighted filter with weights being applied to differentially delayed signals. The input signal to the IIR filter 51 is applied as one of the input signals of a multiple-input digital adder 510 that generates the output signal of the IIR filter 51. The output signal of the IIR filter 51 is applied to a delay line having as its initial cascaded components a bulk delay device 511, an FIR filter section 512, a bulk delay device 513, an FIR filter section 514, a bulk delay device 515, an FIR filter section 516, a bulk delay device 517, and an FIR filter section 518. The output signals from the respective sum-and-weight portions of the output-weighted FIR filter sections 512, 514, 516 and 518 are linearly combined with each other (and output signals from any other FIR filter sections cascaded after them) and with the filter 51 input signal by the adder 510, to generate the output signal of the IIR filter 51. Each of the FIR filter sections 512, 514, 516 and 518 can cancel a respective post-ghost from that output signal.

FIG. 10 shows one form in which the sparsely weighted FIR filter 52 can be implemented. In this FIG. 10 form, the FIR filter 52 is an output-weighted filter with weights being applied to differentially delayed signals. The input signal to the FIR filter 52 is applied to a delay line having as its final cascaded components a bulk delay device 529, an FIR filter section 528, a bulk delay device 527, an FIR filter section 526, a bulk delay device 525, an FIR filter section 524, a bulk delay device 523, an FIR filter section 522 and a bulk delay device 521. The output signals from the respective sum-and-weight portions of the output-weighted FIR filter sections 522, 524, 526 and 528 are linearly combined with each other (and output signals from any other FIR filter sections cascaded before them) and with the output signal from the a bulk delay device 523, using a multiple-input digital adder 520, thereby to generate the output signal of the FIR filter 52. Each of the FIR filter sections 522, 524, 526 and 528 can cancel a respective pre-ghost from that output signal.

The respective delay of each of the bulk delay devices 511, 513, 515, 517, 521, 523, 525, 527 and 529 is programmable in response to a digital signal received in a temporary storage register thereof. The FIR filter sections 522, 524, 526 and 528 are each a multiply-tapped delay line having a sum-and-weight network for applying output weights to its tap signals, each of which weights is programmable in response to a digital signal received in a respective temporary storage register of that FIR filter section.

One skilled in the art of digital filter design can readily convert the output-weighted designs of FIGS. 9 and 10 to input-weighted forms using known design procedures, but output-weighted forms are often preferred for filters with adjustable parameters because filtering functions can be adjusted immediately without having to clear out old samples. In a sparsely weighted filter, changes in bulk delays will require having to wait to clear out old samples in order not to introduce artifacts into the image, and these changes are best made during a vertical retrace blanking interval. Alteration of filter response by adjusting tap weights can be done almost instantly, but are better made during a horizontal retrace blanking interval.

The procedures of FIGS. 4 and 5 may be modified so the computer 55 performs the UPDATE IIR COEFFICIENTS step 86 after the UPDATE FIR COEFFICIENTS step 87, rather than before. The FIG. 6 procedure may be modified so the computer 55 performs the CALCULATE IIR COEFFICIENTS step 96 after the CALCULATE FIR COEFFICIENTS step 97, rather than before.

Referring to the FIG. 11 flow chart, the procedures involved in the steps 96 and 97 of the FIG. 6 procedure will now be considered in greater detail. The details of the steps 96 and 97 of the FIG. 6 procedure are also pertinent to a more complete understanding of the steps 86 and 87 of the FIG. 4. In this more detailed description the filters 51 and 52 will be referred to as if they have the exemplary structures of FIGS. 9 and 10, respectively.

The initial DETERMINE MIDDLE TERM OF PREDOMINANT IMAGE step 95 in the FIG. 9 flow chart is begun by the computer 55 when a Y(es) output signal is generated by the STABLE GHOST? decision step 85. In step 95 the group of very largest energy terms of the normalized approximated reception channel DFT generated in the CHANNEL CHARACTERIZATION step 84, which group of terms describes the predominant image, is determined and used to establish a time base the computer 55 subsequently uses in calculating the filtering parameters of the IIR filter 51 and FIR filter 52 used for canceling ghosts. The determination of which group of the terms has the most energy is performed in the CHANNEL CHARACTERIZATION step 84 and the results of that determination can be carried over in the internal memory of the computer 55 for use in the steps 96 and 97—or, alternatively, the computer 55 may be programmed to repeat that determination at the outset of the series of steps 96 and 97. The terms of the normalized approximated reception channel DFT that are later in time than the group of the terms that has the most energy are considered to be in the post-ghost region and are thus to be used as the basis for calculating the adjustable filtering parameters of the IIR filter 51. The terms of the normalized approximated reception channel DFT that are earlier in time than the group of the terms that has the most energy are considered to be in the pre-ghost region and are thus to be used as the basis for calculating the adjustable filtering parameters of the FIR filter 52. The boundary between the post-ghost region and the pre-ghost region is more sharply defined within the group of the terms having the most energy, the computer 55 being programmed for selecting the largest of these terms (or a "preferred" one of them where there is a plurality of largest terms) as the middle term of the temporal spectrum of the predominant image.

Supposing the CALCULATE IIR COEFFICIENTS step 96 to precede the CALCULATE FIR COEFFICIENTS step 97 in the FIG. 6 procedure, steps 961 and 962, which are substeps of the step 96 are performed by the computer 55 after step 95. Then, steps 971 and 972, which are substeps of the step 97 are performed by the computer 55.

In the DETERMINE BULK DELAYS FOR POST-GHOST CANCELATION step 961, delays provided by the bulk delay devices in the sparsely weighted IIR filter 51 are calculated by the computer 55. In the CHANNEL CHARACTERIZATION step 84, the largest local terms and their closeby terms, as are descriptive of the predominant image and strong ghost images, were tagged in the internal memory of the computer 55. The number of terms in the approximated DFT for the reception channel that are later in time than the very largest term, and which either describe the predominant image or are in the next later run of untagged zero-value terms, are counted by the computer 55, which temporarily stores the resulting count in its internal memory and uses the count to program the delay of the bulk delay device 511. The number of terms in each of the runs of untagged zero-value terms successively later in time are counted by the computer 55, which temporarily stores the respective successive counts in its internal memory and uses the counts to program delays in the bulk delay devices 513, 515, 517 ..., respectively. Step 961 generates the indexing information for placing the FIR filter sections 512, 514, 516 and 518 at proper delay intervals for the subsequent step 962.

In the DETERMINE TAP WEIGHTS FOR POST-GHOST CANCELATION step 962, the computer 55 considers each successively later group of tagged terms in turn and calculates the tap weights for the weight-and-sum network of the corresponding one of the output-weighted FIR filter sections 512, 514, 516, 518, ... . The subroutine is similar to either the FIG. 8 or FIG. 9 subroutine for calculating equalization filter 53 tap weights, except that the DFT of the ghosted Bessel chirp and the DFT of the ghost-free Bessel chirp drawn from the internal memory of the computer 55 both extend over a time interval of an entire scan line or two, and are indexed in time vis-a-vis each other. Indexing is by the sum of the time intervals spanned by the bulk delays preceding the one of the FIR filter sections 512, 514, 516, 518, ... for which tap weights are being calculated, the delays through the multiply-tapped delay lines through each previous one of those output-weighted FIR filter sections, and half the delay through the multiply-tapped delay line through the FIR filter section for which tap weights are being calculated.

In the DETERMINE BULK DELAYS FOR PRE-GHOST CANCELATION step 971 the number of terms in the approximated DFT for the reception channel that are earlier in time than the very largest term, and which either describe the predominant image or are in the next earlier run of untagged zero-value terms, are counted by the computer 55, which temporarily stores the resulting count in its internal memory and uses the count to program the delay of the bulk delay device 521. The number of terms in each of the runs of untagged zero-value terms successively earlier in time are counted by the computer 55, which temporarily stores the respective successive counts in its internal memory and uses the counts to program delays in the bulk delay devices 523, 525, 527 . . . , respectively. The delay of the initial bulk delay (529 in FIG. 10) in the FIR filter 52 delay line is calculated by subtracting the delay of all the succeeding elements in that delay line from a value of delay associated with the earliest pre-ghost that suppression is ever to be afforded to; this keeps constant the delay that is provided to the predominant image, so that changes in pre-ghost cancelation does not introduce any side-to-side shake into that image. Step 971 generates the indexing information for placing the FIR filter sections 522, 524, 526 and 528 at proper delay intervals for the subsequent step 972.

In the DETERMINE TAP WEIGHTS FOR PRE-GHOST CANCELATION step 972, the computer 55 considers each successively earlier group of tagged terms in turn and calculates the tap weights for the weight-and-sum network of the corresponding one of the output-weighted FIR filter sections 522, 524, 526, 528, . . . . The subroutine is similar to either the FIG. 8 or FIG. 9 subroutine for calculating equalization filter 53 tap weights, except that the DFT of the ghosted Bessel chirp and the DFT of the ghost-free Bessel chirp drawn from the internal memory of the computer 55 both extend over a time interval of an entire scan line or two, and are indexed in time vis-a-vis each other. Indexing is by the sum of the time intervals spanned by the bulk delays succeeding the one of the FIR filter sections 522, 524, 526, 528, . . . for which tap weights are being calculated, the delays through the multiply-tapped delay lines through each succeeding one of those output-weighted FIR filter sections, and half the delay through the multiply-tapped delay line through the FIR filter section for which tap weights are being calculated. After step 971 is completed a STEP DONE condition 950 for the steps 96 and 97 is reached.

Steps 95, 961, 962, 971 and 972 as thusfar described, together with applications of the computed filtering parameters to the IIR filter 51 and to the FIR filter 52, are essentially similar to the steps 86 and 87 of the FIG. 4 method. In steps 95, 961, 962, 971 and 972 the computer 55 calculates filtering parameters for the IIR filter 51 and for the FIR filter 52 on a separable basis. This generates a correct overall ghost-cancelation response for the cascaded filters 51 and 52 only if there are no macroghosts, if there are only trailing macroghosts and no leading macroghosts, or if there are only leading macroghosts and no trailing macroghosts.

Assume the cascade connection of the IIR filter 51, the FIR filter 52 and the equalization filter is as shown in FIG. 2. If there are pre-ghosts as well as post-ghosts, the independent calculation of the IIR filter 51 parameters causes them to be such as to delay the predominant image and combine it destructively with each post-ghost. All post-ghosts are suppressed, without generating repeats. The IIR filter 51 delays each pre-ghost similarly to the predominant image, but each delayed pre-ghost usually does not destructively combine with anything and gives rise to a "filter-generated" ghost. Each pre-ghost gives rise to one "filter-generated" ghost for each post-ghost being cancelled, ignoring repeats. By way of example, suppose that relative to the predominant image there are two pre-ghosts at $-10\ \mu S$ and $-3\ \mu S$, respectively, and that there are three post ghosts at 4 $\mu S$, 8 $\mu S$, and 20 $\mu S$, respectively. Each pre-ghost gives rise to three "filter-generated" ghosts delayed therefrom by the amount of the delay of the post-ghost respective to the dominant image, and attenuated according to the magnitude of the post-ghost respective to the dominant image. At the IIR filter 51 output, the original $-10\ \mu S$ pre-ghost give rise to "filter-generated" ghost located in time at $-6\ \mu S$, $-2\ \mu S$, and $+10\ \mu S$ relative to the predominant image; and the $-3\ \mu S$ pre-ghost gives rise to "filter-generated" ghosts located in time at $+1\ \mu S$, $+5\ \mu S$, and $+17\ \mu S$ relative to the predominant image. The magnitude of any one of these "filter-generated" ghosts is the product of the magnitudes of the pre-ghost and post-ghost giving rise to that "filter-generated" ghost. This process of "internal" ghost generation repeats with progressively reduced amplitude. For ideal ghost cancelation, these repeat ghosts must also be cancelled or attenuated below levels subjectively found objectionable.

If the deghosting filter structure is IIR filter 52 following the FIR filter 51, then the post-ghosts give rise to "filter-generated" ghosts at the output of the FIR filter 51. The locations of "filter-generated" ghosts are advanced in time relative to the postghosts giving rise to them, the amounts of advancement depending upon the amounts of time the pre-ghosts precede the predominant image.

Since the locations and magnitude of initial internally generated ghosts can be easily precomputed, the computer 55 can be programmed to compute coefficients for a ghost-cancelation filter that will "generate" ghosts of "opposite" magnitude at appropriate locations. Thus when a ghost-cancelation filter gives rise to a "filter-generated" ghost, it gets cancelled due to the "existing" ghost of opposite polarity at the same location. Simultaneously, repeat generation of the ghosts is also prevented. The CALCULATE CORRECTIONS FOR "FILTER-GENERATED" GHOSTS step 98 in the FIG. 6 method corrects for the interaction between the responses of the filters 51 and 52 that would otherwise give rise to "filter-generated" ghosts when both leading and trailing macroghosts were to accompany the predominant image.

The more detailed flow chart of FIG. 13 shows substeps of the FIG. 6 step 98, carried out by the computer 55 after the steps 95-972. The START condition 980 is entered when the last of the steps 96 and 97 is completed or "done". An initial ARE THERE BOTH PRE- & POST-GHOSTS? decision step 981 is performed by the computer 55, and a N(O) signal result will direct the procedure immediately to a STEP DONE condition 988, which is followed by the UPDATE ALL DE-GHOST FILTERS step 99 of the FIG. 6 main routine.

A Y(ES) signal result will cause the computer 55 to continue the subroutine with a CALCULATE DFT OF CONVOLVED IIR & FIR GHOST-CANCELATION FILTER RESPONSES substep 982. In substep 982 the computer 55 is programmed to multiply the magnitude of each of the terms of the DFT of the response of one of the filters 51 and 52 by the magnitude of each of the terms of the DFT of the response of the other filter, the respective products determining the magnitudes of respective terms in the DFT of the convolved responses—i.e., the DFT of the cascade connection of the filters 51 and 52. In substep 982 the computer 55 is further programmed to linearly combine the lead of the pre-ghost and the lag of the post-ghost giving rise to each term of the DFT of the convolved responses, thereby to determine the location in time of that term.

A DETERMINE STRONG "FILTER-GENERATED" GHOSTS & RECHARACTERIZE CHANNEL substep 983 is then performed by the computer 55. In a procedure similar to that described previously in regard to substep 845 of the FIG. 7 subroutine, it is determined whether or not each "filter generated" ghost has sufficient energy to be of concern. A "filter generated" ghost determined in substep 983 to have sufficient energy to be of concern, which ghost occurs during a time interval otherwise occupied by non-tagged zero terms in the channel characterization results and in the corresponding filter parameter listings, replaces those non-tagged zero terms term by term on a tagged basis to "recharacterize" the channel.

Substeps 984, 985, 986 and 987 which follow the substep 983 are carried out by the computer 55 substantially the same way as substeps 961, 962, 963 and 964, respectively, but proceed from the "recharacterized" channel characterization results, rather than the original channel characterization results. With the completion of the substeps 984, 985, 986 and 987, the STEP DONE condition 988 is reached by the computer 55, which is followed by the UPDATE ALL DE-GHOST FILTERS step 99 of the FIG. 6 main routine.

Where the GCR signal acquisition is carried out so there is little likelihood of appreciable accompanying noise, the UPDATE EQUALIZATION COEFFICIENTS step 90 in the FIG. 4 method or in the FIG. 6 method could be carried out in the following alternative way. A subroutine similar to the FIG. 12 subroutine used to carry out the UPDATE EQUALIZATION COEFFICIENTS step 94 is performed by the computer 55, except that the substep 944 is modified to increment (or decrement) the tap weights for the equalization filter 53, not by adjustments that are fractions of calculated changes in the cross-correlation, but rather by adjustments that equal calculated changes in the cross-correlation. This one-shot adjustment procedure does not discriminate against noise accompanying the GCR signal.

The ghost suppression methods described herein are applicable for GCR signals other than those described, although suitable modifications may be necessary in regard to the circuitry used to acquire GCR signals for application to the filter-coefficients computer 55. In any case, the data concerning the a priori information about the ghost-free GCR signal that is contained in the permanent memory portion of the internal memory of the computer 55 will have to be modified to suit the different GCR signal standard. In construing the scope of the method claims which follow this specification, this applicability of the methods to different GCR signal standards should be taken into consideration.

One skilled in the art of programming microcomputers will, when familiarized with the procedures for suppressing ghosts in television signals taught herein, be enabled to make a large number of variants upon the methods specifically described herein; and this fact should be borne in mind when construing the claims which follow, such that the scope of the broader ones of these claims encloses all such variants as embody the spirit of the invention.

What is claimed is:

1. A method for operating apparatus comprising a receiver for receiving through a reception channel a video signal with accompanying ghost cancelling reference (GCR) signal both subject at times to being ghosted; a ghost-suppression filter connected for responding to said video signal, said ghost-suppression filter having adjustable filtering parameters; a computer for calculating the adjustable filtering parameters of said ghost-suppression filter, said computer provided with read-only memory for permanently storing data descriptive of ghost-free GCR signal and with further memory for purposes of temporary storage; and a GCR-signal separator for separating a separated GCR signal from the response of said ghost-suppression filter; said method avoiding the erroneous adjustment of the filtering parameters of said ghost-suppression filter during non-stable ghosting conditions such as "aircraft flutter" and comprising the steps of:

a) initializing the adjustable filtering parameters of said ghost-suppression filter;

b) loading said separated GCR signal into said further memory of said computer, for purposes of temporary storage, which loading is done at least after step (a);

c) each time after step (b) is performed, performing calculations within said computer for characterizing the reception channel as described by the separated GCR signal loaded into said computer during that step (b) to generate a set of updated channel characterization results;

d) each time after step (c) is performed, temporarily storing within the further memory of said computer the set of updated channel characterization results generated by that step (c);

e) each time after step (c) is performed, determining within said computer whether or not ghosting conditions have changed, by comparing each portion of the updated set of channel characterization results with a corresponding portion of the previously temporarily stored set of channel characterization results, ghosting conditions being determined not to have changed only when corresponding portions of the compared sets of channel characterization results in every comparison differ by less than a first threshold value, said method looping back to step (b) when ghosting conditions are determined to have changed when corresponding portions of the compared sets of channel characterization results in any of said comparisons differ by as much as or more than said first threshold value; and f) each time ghosting conditions are determined not to have changed when step (e) is performed, thereafter performing calculations within said computer for determining the adjustable filtering parameters for said ghost-suppression filter.

2. A method for operating apparatus comprising a receiver for receiving through a reception channel a video signal with accompanying ghost cancelling reference (GCR) signal both subject at times to being ghosted; a ghost-suppression filter connected for responding to said video signal which ghost-suppression filter comprises in a cascade connection a first filter of a type having adjustable filtering parameters that can be adjusted for suppressing macroghosts in its output response and a second filter of a type having adjustable filtering parameters that can be adjusted for suppressing microghosts in its output response; a computer for calculating the adjustable filtering parameters of said first and said second filters, said computer provided with read only memory for permanently storing data descriptive of ghost-free GCR signal and with further memory for purposes of temporary storage; and a GCR-signal separator for separating a separated GCR signal from the response of said ghost-suppression fitter; said method comprising the steps of:

a) initializing the adjustable filtering parameters of said first and second filters;

b) loading said separated GCR signal into said further memory of said computer, for purposes of temporary storage, which loading is done at least after step (a);

c) each time after step (b) is performed, performing calculations within said computer for characterizing the reception channel as described by the separated GCR signal loaded into said computer during that step (b) to generate a set of updated channel characterization results;

d) each time after step (c) is performed, temporarily storing within the further memory of said computer the set of updated channel characterization results generated by that step (c);

e) each time after step (c) is performed, determining within said computer whether or not ghosting conditions have changed, by comparing each portion of the updated set of channel characterization results with a corresponding portion of the previously temporarily stored set of channel characterization results, ghosting conditions being determined not to have changed only when corresponding portions of the compared sets of channel characterization results in every comparison differ by less than a first threshold value, said method looping back to step (b) when ghosting conditions are determined to have changed when corresponding portions of the compared sets of channel characterization results in any of said comparisons differ by as much as or more than said first threshold value;

f) each time ghosting conditions are determined not to have changed when step (e) is performed, thereafter performing calculations within said computer for determining the adjustable filtering parameters for said first filter;

g) after step (f) has been performed so that the adjustable filtering parameters for said first filter satisfactorily reduce all ghosts in the separated GCR signal, performing calculations within said computer for determining the adjustable filtering parameters for said second filter;

h) after step (g) has been performed, loading an updated separated GCR signal into said further memory of said computer, for purposes of temporary storage;

i) each time after step (h) is performed, performing calculations within said computer for characterizing the reception channel as described by the updated separated GCR signal loaded into said computer during that step (h) to generate a set of updated channel characterization results;

j) each time after step (i) is performed, temporarily storing within the further memory of said computer the set of updated channel characterization results generated by that step (i);

k) each time after step (i) is performed, determining within said computer whether or not ghosting conditions have changed, by comparing each portion of the updated set of channel characterization results with a corresponding portion of the previously temporarily stored set of channel characterization results, ghosting conditions being determined not to have changed only when corresponding portions of the compared sets of channel characterization results in every comparison differ by less than a second threshold value, said method looping back to step (a) when ghosting conditions are determined to have changed when corresponding portions of the compared sets of channel characterization results in any of said comparisons differ by as much as or more than said second threshold value.

3. A method as set forth in claim 2 wherein each of the steps (c) and (i) comprises the substeps of:

using said computer to calculate a DFT of said separated GCR signal loaded into said computer in the just previous step; and then using said computer to divide the terms of the DFT of said separated GCR signal by the corresponding terms of a DFT of said ghost-free GCR signal stored in said permanent memory and read therefrom, thereby to generate a DFT of said reception channel, the terms of the DFT of said reception channel comprising a set of channel characterization results generated by the step.

4. A method as set forth in claim 3 wherein step (f) comprises the substeps of:

$f_a$) using said computer to determine the largest term of the DFT characterizing the response of said reception channel as read from the further memory of said temporary memory in said computer;

$f_b$) after substep ($f_a$), using said computer for dividing all of the terms of the DFT characterizing the response of said reception channel by the largest term, thereby to generate corresponding terms of a normalized DFT characterizing the response of said reception channel;

$f_c$) after substep ($f_b$), using said computer for replacing by a respective zero each of the terms of the normalized DFT that are smaller than a threshold value, thereby to generate an approximated normalized DFT characterizing the response of said reception channel;

$f_d$) after substep ($f_c$), using said computer for complementing all of the non-zero terms of said approximated normalized DFT characterizing the response of said reception channel except for its largest, thereby to generate a DFT of said first filter; and $f_e$) after substep ($f_d$), using said computer for calculating the adjustable filtering parameters for said first filter from its DFT.

5. A method as set forth in claim 3 wherein in the step (g) the substep of performing calculations within said computer for determining the adjustable filtering parameters for said second filter is carried out with the following substeps:

$g_a$) taking from said further memory of said computer a plurality of terms of the DFT of said separated GCR signal most recently computed and temporarily stored, said terms defining a truncated DFT of said separated GCR signal;

$g_b$) using said computer to divide the terms of the truncated DFT of said separated GCR signal by corresponding terms of the DFT of said ghost-free GCR signal stored in said permanent memory and read therefrom, thereby to generate a truncated DFT of said reception channel;

$g_c$) generating with said computer a DFT of said second filter so as to complement the truncated DFT of said reception channel;

$g_d$) determining with said computer updated values for the adjustable filtering parameters of said second filter in accordance with its DFT; and $g_e$) applying the updated values for the adjustable filtering parameters of said second filter to said second filter.

6. A method as set forth in claim 3 wherein in the step (g) the substep of performing calculations within said computer for determining the adjustable filtering parameters for said second filter is carried out with the following substeps:

$g_a$) reading from said further memory of said computer, the DFT of said separated GCR signal most recently computed and temporarily stored;

$g_b$) calculating with said computer a first truncated DFT, which is of a convolution of the response of said second filter with said separated GCR signal most recently computed and temporarily stored;

$g_c$) reading from said permanent memory of said computer, terms of a second truncated DFT, which is of the ghost-free GCR signal as convolved by a desired reception channel response;

$g_d$) with said computer, determining departures of the terms of said first truncated DFT from the corresponding terms of the second truncated DFT;

$g_e$) responding to each said departure for adjusting the corresponding adjustable filtering parameter for said second filter in a direction to reduce that departure.

7. A method for operating apparatus comprising a receiver for receiving through a reception channel a video signal with accompanying ghost cancelling reference (GCR) signal both subject at times to being ghosted; an IIR filter of a type having adjustable filtering parameters that can be adjusted for suppressing in its output response trailing macroghosts or post-ghosts accompanying its input signal; an FIR filter of a type having adjustable filtering parameters that can be adjusted for suppressing in its output response leading macroghosts or pre-ghosts accompanying its input signal; a ghost-suppression filter connected for responding to said video signal which ghost-suppression filter comprises the cascade connection of said IIR filter and said FIR filter; a computer for calculating the adjustable filtering parameters of said first and said second digital filters, said computer provided with read-only memory for permanently storing data descriptive of ghost-free GCR signal and with further memory for purposes of temporary storage; and a GCR-signal separator for separating a separated GCR signal from the response of said ghost-suppression filter; said method comprising the steps of:

a) initializing the adjustable filtering parameters of said first and second digital filters;

b) loading said separated GCR signal into said further memory of said computer, for purposes of temporary storage, which loading is done at least after step (a);

c) each time after step (b) is performed, performing calculations within said computer for characterizing the reception channel as described by the separated GCR signal loaded into said computer during that step (b) to generate a set of updated channel characterization results;

d) each time after step (c) is performed, temporarily storing within the further memory of said computer the set of updated channel characterization results generated by that step (c);

e) each time after step (c) is performed, determining within said computer whether or not ghosting conditions have changed, by comparing each portion of the updated set of channel characterization results with a corresponding portion of the previously temporarily stored set of channel characterization results, ghosting conditions being determined not to have changed only when corresponding portions of the compared sets of channel characterization results in every comparison differ by less than a first threshold value, said method looping back to step (b) when ghosting conditions are determined to have changed when corresponding portions of the compared sets of channel characterization results in any of said comparisons differ by as much as or more than said first threshold value;

f) each time ghosting conditions are determined not to have changed when step (e) is performed, thereafter performing calculations within said computer for determining the adjustable filtering parameters for said IIR filter and said FIR filter in the cascade connection which said ghost-suppression filter comprises;

g) after step (f) has been performed so that the adjustable filtering parameters for said IIR filter and said FIR filter satisfactorily reduce all ghosts in the separated GCR signal, proceeding from step (f) to step (h);

h) loading an updated separated GCR signal into said further memory of said computer, for purposes of temporary storage;

i) each time after step (h) is performed, performing calculations within said computer for characterizing the reception channel as described by the updated separated GCR signal loaded into said computer during that step (h) to generate a set of updated channel characterization results;

j) each time after step (i) is performed, temporarily storing within the further memory of said computer the set of updated channel characterization results generated by that step (i);

k) each time after step (i) is performed, determining within said computer whether or not ghosting conditions have changed, by comparing each portion of the updated set of channel characterization results with a corresponding portion of the previously temporarily stored set of channel characterization results, ghosting conditions being determined not to have changed only when corresponding portions of the compared sets of channel characterization results in every comparison differ by less than a second threshold value, said method looping back to step (a) when ghosting conditions are determined to have changed when corresponding portions of the compared sets of channel characterization results in any of said comparisons differ by as much as or more than said second threshold value.

8. A method as set forth in claim 7 for operating said apparatus when the cascade connection of said IIR filter and said FIR filter in said ghost-suppression filter further includes a further FIR filter for suppressing microghosts, in which method the step (g) comprises the substeps of:

performing calculations within said computer for determining updated adjustable filtering parameters for said further FIR filter; and applying said updated adjustable filtering parameters to said further FIR filter.

9. A method as set forth in claim 8, wherein the step (c) includes a substep of calculating a truncated DFT of said separated GCR signal with said computer, wherein the step (d) includes a substep of temporarily storing said truncated DFT of said separated GCR signal in said further memory of said computer, and wherein the step (g) is carried out with the following substeps:

$g_a$) taking from said further memory of said computer a plurality of terms of the DFT of said separated GCR signal temporarily stored, said terms defining said truncated DFT of said separated GCR signal;

$g_b$) using said computer to divide the terms of the truncated DFT of said separated GCR signal by corresponding terms of the DFT of said ghost-free GCR signal stored in said permanent memory and read therefrom, thereby to generate a truncated DFT of said reception channel;

$g_c$) generating with said computer a DFT of said further FIR filter so as to complement the truncated DFT of said reception channel; and $g_d$) with said computer, determining updated values for the adjustable filtering parameters of said further FIR filter in accordance with its DFT; and $g_e$) applying to said further FIR filter the updated adjustable filtering parameters for said further FIR filter.

10. A method as set forth in claim 8 wherein in the step (g) the substep of performing calculations within said computer for determining the adjustable filtering parameters for said further FIR filter is carried out with the following substeps:

$g_a$) reading from said further memory of said computer, said separated GCR signal most recently temporarily stored;

$g_b$) calculating with said computer a first truncated DFT, which is of the convolution of the response of said second filter with said separated GCR signal most recently computed and temporarily stored;

$g_c$) reading from said permanent memory of said computer, terms of a second truncated DFT, which is of the ghost-free GCR signal as convolved by a desired reception channel response;

$g_d$) with said computer, determining departures of the terms of said first truncated DFT from the corresponding terms of the second truncated DFT;

$g_e$) responding to each said departure for adjusting the corresponding adjustable filtering parameter for said second filter in a direction to reduce that departure.

11. A method as set forth in claim 7 wherein said step (f) comprises the substeps of:

$f_a$) on a separable basis, calculating within said computer adjustable filtering parameters for said IIR filter; and $f_b$) on a separable basis, calculating within said computer adjustable filtering parameters for said FIR filter.

12. A method as set forth in claim 11 wherein in said step (f) said substep of calculating adjustable filtering parameters for said IIR filter is performed before said substep of calculating adjustable filtering parameters for said FIR filter.

13. A method as set forth in claim 11 wherein in said step (f) said substep of calculating adjustable filtering parameters for said IIR filter is performed after said substep of calculating adjustable filtering parameters for said FIR filter.

14. A method as set forth in claim 11 wherein said step (f) further comprises the substeps of:

$f_c$) applying to said IIR filter said adjustable filtering parameters calculated in substep ($f_a$), before any correction of said adjustable filtering parameters for said IIR filter calculated in said substep;

$f_d$) applying to said FIR filter said adjustable filtering parameters calculated in substep ($f_b$), before any correction of said adjustable filtering parameters for said FIR filter calculated in said substep;

$f_e$) determining whether or not the adjustable filtering parameters of said IIR filter and said FIR filter require adjustment in the current step (f) in order to reduce all ghosts below said first threshold value;

$f_f$) counting the determinations that the adjustable filtering parameters of said IIR filter and said FIR filter require adjustment in the current step (f) in order to reduce all ghosts below a prescribed third threshold value, the count being initially zero and being reset to zero whenever there is a determination that the adjustable filtering parameters of said IIR filter and said FIR filter do not require adjustment in the current step (f) in order to reduce all ghosts below said first threshold value;

$f_g$) looping back to step (b) responsive to said count being below a prescribed count and the determination that the adjustable filtering parameters of said IIR filter and said FIR filter require adjustment in the current step (f) in order to reduce all ghosts below said first threshold value.

15. A method as set forth in claim 14 for operating said apparatus when the cascade connection of said IIR filter and said FIR filter in said ghost-suppression filter further includes a further FIR filter for suppressing microghosts comprises the substeps of:

$g_a$) performing calculations within said computer for determining updated adjustable filtering parameters for said further FIR filter; and $g_b$) applying said updated adjustable filtering parameters to said further FIR filter.

16. A method as set forth in claim 11 wherein said step (f) further comprises the substeps of:

$f_c$) calculating with said computer corrections for the adjustable filtering parameters of said IIR filter and said FIR filter;

$f_d$) making said corrections to the adjustable filtering parameters of said IIR filter and said FIR filter; and $f_e$) applying to said IIR filter and said FIR filter the resulting corrected adjustable filtering parameters, whereupon the step (f) has been performed so that the adjustable filtering parameters for said IIR filter and said FIR filter satisfactorily reduce all ghosts in the updated separated GCR signal.

17. A method as set forth in claim 16 for operating said apparatus when the cascade connection of said IIR filter and said FIR filter in said ghost-suppression filter further includes a further FIR filter for suppressing microghosts, comprises the substeps of:

$g_a$) performing calculations within said computer for determining updated adjustable filtering parameters for said further FIR filter; and $g_b$) applying said updated adjustable filtering parameters to said further FIR filter.

18. A method as set forth in claim 7 wherein each of the steps (c) and (i) comprises the substeps of:

using said computer to calculate the DFT of said separated GCR signal loaded into said computer in the just previous step; and then using said computer to divide the terms of the DFT of said separated GCR signal by the corresponding terms of the DFT of said ghost-free GCR signal stored in said permanent memory and read therefrom, thereby to generate the DFT of said reception channel, the terms of the DFT of said reception channel comprising the set of channel characterization results generated by the step.

19. A method as set forth in claim 18 wherein step (f) comprises the substeps of:

$f_a$) using said computer to determine the largest term of the DFT characterizing the response of said reception channel as read from the further memory of said temporary memory in said computer;

$f_b$) after substep ($f_a$), calculating with said computer the adjustable filtering parameters of said IIR filter from the smaller terms of the DFT characterizing the response of said reception channel later in time than the largest term of the DFT characterizing the response of said reception channel, which smaller terms of the DFT characterizing the response of said reception channel later in time than the largest term of the DFT characterizing the response of said reception channel exceed a prescribed threshold value; and $f_c$) after substep ($f_a$), calculating with said computer the adjustable filtering parameters of said FIR filter proceeding from the smaller terms of the DFT characterizing the response of said reception channel that are earlier in time than the largest term of that DFT and that also exceed a prescribed threshold value.

20. A method as set forth in claim 19 wherein said step (f) further comprises the substeps of:

$f_d$) applying to said IIR filter said adjustable filtering parameters calculated in said substep ($f_b$);

$f_e$) applying to said FIR filter said adjustable filtering parameters calculated in said substep ($f_c$);

$f_f$) determining whether or not the adjustable filtering parameters of said IIR filter and said FIR filter require adjustment in the current step (f) in order to reduce all ghosts below said first threshold value;

$f_g$) counting the determinations that the adjustable filtering parameters of said IIR filter and said FIR filter require adjustment in the current step (f) in order to reduce all ghosts below a prescribed third threshold value, the count being initially zero and being reset to zero whenever there is a determination that the adjustable filtering parameters of said IIR filter and said FIR filter do not require adjustment in the current step (f) in order to reduce all ghosts below said first threshold value;

$f_h$) looping back to step (b) responsive to said count being below a prescribed count and the determination that the adjustable filtering parameters of said IIR filter and said FIR filter require adjustment in substep ($f_f$) of the current step (f) in order to reduce all ghosts below said first threshold value.

21. A method as set forth in claim 20 for operating said apparatus when the cascade connection of said IIR filter and said FIR filter in said ghost-suppression filter further includes a further FIR filter for suppressing microghosts, comprises the substeps of:

$g_a$) performing calculations within said computer for determining updated adjustable filtering parameters for said further FIR filter; and $g_b$) applying said updated adjustable filtering parameters to said further FIR filter.

22. A method as set forth in claim 18 wherein said step (f) further comprises the substeps of:

$f_d$) calculating with said computer corrections for the adjustable filtering parameters of said IIR filter and said FIR filter;

$f_e$) making said corrections to the adjustable filtering parameters of said IIR filter and said FIR filter; and $f_f$) applying to said IIR filter and said FIR filter the resulting corrected adjustable filtering parameters, whereupon the step (f) has been performed so that the adjustable filtering parameters for said IIR filter and said FIR filter satisfactorily reduce all ghosts in the updated separated GCR signal.

23. A method as set forth in claim 22 for operating said apparatus when the cascade connection of said IIR filter and said FIR filter in said ghost-suppression filter further includes a further FIR filter for suppressing microghosts, comprises the substeps of:

$g_a$) performing calculations within said computer for determining updated adjustable filtering parameters for said further FIR filter; and $g_b$) applying said updated adjustable filtering parameters to said further FIR filter.

24. A method for operating apparatus comprising a receiver for receiving through a reception channel a video signal with accompanying ghost cancelling reference (GCR) signal both subject at times to being ghosted; an IIR filter of a type having adjustable filtering parameters that can be adjusted for suppressing in its output response trailing macroghosts or post-ghosts accompanying its input signal; a first FIR filter of a type having adjustable filtering parameters that can be adjusted for suppressing in its output response leading macroghosts or preghosts accompanying its input signal; a second FIR filter of a type having adjustable filtering parameters that can be adjusted for suppressing in its output response microghosts accompanying its input signal; a ghost-suppression filter connected for responding to said video signal which ghost-suppression filter comprises the cascade connection of said IIR filter, said first FIR filter, and said second FIR filter; a computer for calculating the adjustable filtering parameters of said first and said second digital filters, said computer provided with read-only memory for permanently storing data descriptive of ghost-free GCR signal and with further memory for purposes of temporary storage; and a GCR-signal separator for separating a separated GCR signal from the response of said ghost-suppression filter; said method comprising the steps of:

a) initializing the adjustable filtering parameters of said first and second digital filters;

b) loading said separated GCR signal into said further memory of said computer, for purposes of temporary storage, which loading is done at least after step (a.);

c) each time after step (b) is performed, performing calculations within said computer for characterizing the reception channel as described by the separated GCR signal loaded into said computer during that step (b) to generate a set of updated channel characterization results;

d) each time after step (c) is performed, temporarily storing within the further memory of said computer the set of updated channel characterization results generated by that step (c);

e) each time after step (c) is performed, determining within said computer whether or not ghosting conditions have changed, by comparing each portion of the updated set of channel characterization results with a corresponding portion of the previously temporarily stored set of channel characterization results, ghosting conditions being determined not to have changed only when corresponding portions of the compared sets of channel characterization results in every comparison differ by less than a first threshold value, said method looping back to step (b) when ghosting conditions are determined to have changed when corresponding portions of the compared sets of channel characterization results in any of said comparisons differ by as much as or more than said first threshold value;

f) each time ghosting conditions are determined not to have changed when step (e) is performed, thereafter performing calculations within said computer for determining the adjustable filtering parameters for said IIR filter, said first FIR filter and said second FIR filter in the cascade connection which said ghost-suppression filter comprises;

g) after step (f) has been performed so that the adjustable filtering parameters for said IIR filter, said first FIR filter and said second FIR filter satisfactorily reduce all ghosts in the updated separated GCR signal, proceeding from step (f) to step (h);

h) loading an updated separated GCR signal into said further memory of said computer, for purposes of temporary storage;

i) each time after step (h) is performed, performing calculations within said computer for characterizing the reception channel as described by the separated GCR signal loaded into said computer during that step (h) to generate a set of updated channel characterization results;

j) each time after step (i) is performed, temporarily storing within the further memory of said computer the set of updated channel characterization results generated by that step (i);

k) each time after step (i) is performed, determining within said computer whether or not ghosting conditions have changed, by comparing each portion of the updated set of channel characterization results with a corresponding portion of the previously temporarily stored set of channel characterization results, ghosting conditions being determined not to have changed only when corresponding portions of the compared sets of channel characterization results in every comparison differ by less than a second threshold value, said method looping back to step (a) when ghosting conditions are determined to have changed when corresponding portions of the compared sets of channel characterization results in any of said comparisons differ by as much as or more than said second threshold value.

25. A method as set forth in claim 24 wherein said step (f) comprises the substeps of:

$f_a$) calculating with said computer adjustable filtering parameters for said IIR filter on a separable basis and applying them to said IIR filter;

$f_b$) calculating with said computer adjustable filtering parameters for said first FIR filter on a separable basis and applying them to said first FIR filter;

$f_c$) calculating with said computer adjustable filtering parameters for said second FIR filter on a separable basis and applying them to said second FIR filter;

$f_d$) determining whether or not the adjustable filtering parameters of said IIR filter, said first FIR filter and said second FIR filter required adjustment in the current step (f) in order to reduce all ghosts below said first threshold value;

$f_e$) counting the determinations that the adjustable filtering parameters of said IIR filter, said first FIR filter and said second FIR filter required adjustment in the current step (f) in order to reduce all ghosts below a prescribed first threshold value, the count being initially zero and being reset to zero whenever there is a determination that the adjustable filtering parameters of said IIR filter and said FIR filter do not require adjustment in the current step (f) in order to reduce all ghosts below said first threshold value;

$f_g$) looping back to step (b) responsive to said count being below a prescribed count and the determination that the adjustable filtering parameters of said IIR filter and said FIR filter require adjustment in the current step (f) in order to reduce all ghosts below said first threshold value.

26. A method as set forth in claim 25 wherein in said step (f) said substep ($f_a$) is performed before said substep ($f_b$).

27. A method as set forth in claim 25 wherein in said step (f) said substep ($f_a$) is performed after said substep ($f_b$).

28. A method as set forth in claim 24, wherein said substep $f_c$) comprises the sub-substeps of:

reading from said further memory of said computer, said separated GCR signal that has been most recently temporarily stored;

calculating with said computer a first truncated DFT, which is of a convolution of the response of said second filter with said separated GCR signal that has been most recently temporarily stored;

reading from said permanent memory of said computer, terms of a second truncated DFT, which is of the ghost-free GCR signal as convolved by a desired reception channel response;

with said computer, determining departures of the terms of said first truncated DFT from the corresponding terms of the second truncated DFT; and responding to each said departure for updating the corresponding adjustable filtering parameter for said second filter with its previous value as incremented or decremented by an adjustment which is in a direction to reduce that departure and which has an amplitude that is a prescribed fraction of that departure.

29. A method as set forth in claim 24, wherein the step (c) includes a substep of calculating with said computer a DFT of said separated GCR signal, wherein the step (d) includes a substep of temporarily storing the DFT of said separated GCR signal in said further memory of said computer, and wherein said substep $f_c$) comprises the sub-substeps of:

reading from said further memory of said computer, the DFT of said separated GCR signal most recently computed and temporarily stored;

calculating with said computer a first truncated DFT, which is descriptive of a convolution of the response of said second filter with said separated GCR signal most recently computed and temporarily stored, said substep of calculating a first truncated DFT proceeding from the DFT of said separated GCR signal most recently computed and temporarily stored as read from said further memory of said computer;

reading from said permanent memory of said computer, terms of a second truncated DFT, which is of the ghost-free GCR signal as convolved by a desired reception channel response;

with said computer, determining departures of the terms of said first truncated DFT from the corresponding terms of the second truncated DFT; and responding to each said departure for updating the corresponding adjustable filtering parameter for said second filter with its previous value as incremented or decremented by an adjustment which is in a direction to reduce that departure and which has an amplitude that is a prescribed fraction of that departure.

* * * * *

UNITED STATES PATENT AND TRADEMARK OFFICE
CERTIFICATE OF CORRECTION

PATENT NO. : 5,331,416

DATED : July 19, 1994

INVENTOR(S) : Chandrakant B. Patel and Jian Yang

It is certified that error appears in the above-identified patent and that said Letters Patent is hereby corrected as shown below:

Front Page, Item 75, change "Jim" to --Jian--.

Signed and Sealed this

Twenty-eight Day of February, 1995

Attest:

BRUCE LEHMAN

Attesting Officer      *Commissioner of Patents and Trademarks*